(12) United States Patent
Miyakoshi et al.

(10) Patent No.: US 7,060,381 B2
(45) Date of Patent: Jun. 13, 2006

(54) ELECTRIC ENERGY GENERATING ELEMENT

(75) Inventors: Mitsuaki Miyakoshi, Kanagawa (JP);
Hiroshi Miyazawa, Kanagawa (JP);
Tomikazu Watanabe, Tokyo (JP);
Kiyoshi Yamaura, Kanagawa (JP);
Ryuichiro Maruyama, Kanagawa (JP);
Shuichi Takizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 10/089,856

(22) PCT Filed: Jul. 31, 2001

(86) PCT No.: PCT/JP01/06607

§ 371 (c)(1),
(2), (4) Date: Aug. 5, 2002

(87) PCT Pub. No.: WO02/11222

PCT Pub. Date: Feb. 7, 2002

(65) Prior Publication Data

US 2003/0039878 A1    Feb. 27, 2003

(30) Foreign Application Priority Data

Jul. 31, 2000  (JP)  .................... 2000-230734

(51) Int. Cl.
*H01M 2/00* (2006.01)
*H01M 2/02* (2006.01)
*H01M 2/14* (2006.01)

(52) U.S. Cl. ................... 429/34; 429/38; 429/30; 429/39; 429/40

(58) Field of Classification Search ............... 429/34, 429/38, 30, 39, 40
See application file for complete search history.

(56) References Cited

U.S. PATENT DOCUMENTS

| 4,826,741 | A | * | 5/1989 | Aldhart et al. ............ 429/19 |
| 5,312,700 | A | * | 5/1994 | Ishida ...................... 429/30 |
| 6,808,835 | B1 | * | 10/2004 | Green et al. .............. 429/30 |
| 6,813,327 | B1 | * | 11/2004 | Challberg ................ 376/362 |

FOREIGN PATENT DOCUMENTS

| JP | 9-923318 | 4/1997 |
| JP | 9-171842 | 6/1997 |
| JP | 2000-277135 | 10/2000 |
| WO | WO 99/60642 | * 11/1999 |

* cited by examiner

*Primary Examiner*—Patrick Joseph Ryan
*Assistant Examiner*—Angela J Martin
(74) *Attorney, Agent, or Firm*—Bell, Boyd & Lloyd LLC

(57) ABSTRACT

An electrical energy generating device which is able to supply oxygen in atmospheric air efficiently to an oxygen electrode and to vaporize water yielded off efficiently, and which has superior waterproof characteristic. The device includes a number of cells each having a hydrogen electrode plate, a proton conductor film and an oxygen electrode plate, and a sheet cover 5 which is air-permeable and waterproofed and which shrouds each cell.

3 Claims, 10 Drawing Sheets

ELECTRIC ENERGY GENERATING ELEMENT

BACKGROUND OF THE INVENTION

The present invention relates to a device for generating electrical energy. More particularly, it relates to a device for generating electrical energy which enables atmospheric air to be supplied efficiently to an oxygen electrode, which efficiently vaporizes off the water yielded and which has superior waterproof characteristics.

Until now, fossil fuels, such as gasoline or light oil, have been used extensively not only as an energy source for automobiles, but also as an energy source for power generation. Through the use of these fossil fuels, mankind could enjoy such benefits as drastically improved quality of life or industrial development. On the other hand, the earth is imperiled by a serious risk of environmental destruction. Moreover, the resources of fossil fuel tend to be depleted such that difficulties are feared to be met as to a stable supply of fossil fuel over a long term.

Recently, hydrogen is attracting attention as an energy source which is to take the place of the fossil fuel. Hydrogen is contained in water and exists abundantly on the earth, while a large amount of chemical energy is contained per unit weight therein. Moreover, when used as an energy source, hydrogen does not yield obnoxious materials or gases tending to produce global warming. For these reasons, hydrogen is attracting significant attention as being an energy source which is to take the place of fossil fuel and which is clean and plentiful in supply.

Recently, studies and developments in electrical energy generating devices, capable of taking electrical energy from hydrogen energy, are going on briskly, such that expectations are made for application of the electrical energy generating device to large-scale power generation or on-site self-generation, or as a power source for automobiles.

A device for taking electrical energy from hydrogen energy includes a hydrogen electrode, fed with a hydrogen gas, an oxygen electrode, fed with oxygen, and a proton conductor film for transmitting protons formed on the hydrogen electrode to the oxygen electrode. Hydrogen gas fed to the hydrogen electrode is dissociated by a catalyst action into protons and electrons. The electrons are absorbed by a hydrogen electrode while the protons are transported to the oxygen electrode through the proton conductor film. The electrons absorbed in the oxygen electrode are migrated through a load to the oxygen electrode. On the other hand, oxygen fed to the oxygen electrode is combined by the catalyst action with the protons and electrons migrated from the hydrogen electrode to yield water. The electrical energy generating device is constructed so that an electromotive force is generated in this manner across the hydrogen and oxygen electrodes to cause the current to flow through a load.

Since the electrical energy generating device is designed so that oxygen in atmospheric air is supplied to the oxygen electrode to generate the electrical energy, it is mandatory that the device be constructed so as to supply oxygen in atmospheric air to the oxygen electrode. The electrons absorbed by the hydrogen electrode are transported through the load to the oxygen electrode. The oxygen supplied to the oxygen electrode is combined with protons and electrons transported from the hydrogen electrode to yield water. The electrical energy generating device is designed in this manner so that the electromotive force is generated across the hydrogen and oxygen electrodes to cause the current to flow through the load.

Since the electrical energy generating device is constructed so as to supply oxygen in atmosphere to the oxygen electrode to generate the electrical energy, it is mandatory that the device be so constructed as to supply oxygen contained in atmosphere to the oxygen electrode. Also, if oxygen becomes affixed to the oxygen electrode, the efficiency of generation of the electrical energy is lowered. It is therefore essential that the device be constructed so as to vaporize yielded water off efficiently.

On the other hand, if the electrical energy generating device is immersed in water, the electrical energy device may be destroyed due to shorting. Thus, the electrical energy generating device is required to be of a structure having superior waterproof characteristics.

SUMMARY OF THE INVENTION

It is an object of the present invention to provide an electrical energy generating device for generating the electrical energy which enables atmospheric air to be supplied efficiently to an oxygen electrode, which efficiently vaporizes off the water yielded and which is superior in waterproof characteristics.

For accomplishing the above object, the present invention provides an electrical energy generating device including a cell having at least a hydrogen electrode, a proton conductor film, an oxygen electrode, and a sheet cover having an air permeability and waterproof characteristics, with the sheet cover shrouding the cell.

In the electrical energy generating device of the present invention, since the sheet cover shrouding the cell including at least the hydrogen electrode, proton conductor film and the oxygen electrode is air-permeable and exhibits waterproof characteristics, oxygen in atmospheric air can be supplied efficiently to the oxygen electrode for reaction with protons and electrons. Moreover, water yielded on the oxygen electrode by reaction between oxygen, protons and electrons may be efficiently vaporized off, while it is possible to improve the waterproof characteristics of the electrical energy generating device.

The air-permeable waterproofing sheet cover, forming the electrical energy generating device according to the present invention, may be formed of a material selected from the group consisting of polyurethane, micro-porous polyolefin, natural protein hyperfine powder, and waterproofed polyester.

The electrical energy generating device according to the present invention further includes a water-absorbent sheet having an air permeability and a water-absorbing property which is provided inside the sheet cover for shrouding the cell, so that water formed on the oxygen electrode by reaction of oxygen, protons and electrons may be efficiently removed from the oxygen electrode to improve the efficiency in generating the electrical energy.

The water-absorbent sheet, used for the electrical energy generating device according to the present invention, is formed of a water-absorbent resin selected from the group consisting of a cross-linked product of a neutralized polyacrylic acid, a self-crosslinked neutralized polyacrylic acid, starch acrylonitrile graft polymer cross-linked product, a hydrolizate thereof, a saponified product of vinyl acetate acrylic acid ester copolymer, an acrylate acrylamide copolymer cross-linked product, a cross-linked product of acrylic acid 2 acrylamide 2 methylpropanesulfonic acid copolymer salt, a cross-linked product of isobutylene maleic anhydride copolymer salt, cross-linked carboxymethyl cellulose salts and water-absorbent resins selected from the group consisting of one or more of the above products.

The water-absorbent sheet also may be formed by a water-absorbent material obtained on processing the cross-linked product of a neutralized polyacrylic acid, a self cross-linked neutralized polyacrylic acid, a cross-linked product starch acrylonitrile graft polymer, a hydrolizate thereof, a saponified product of vinyl acetate acrylic acid ester copolymer, a cross-linked product of an acrylate acrylamide copolymer, a cross-linked product of acrylic acid 2 acrylamide 2 methylpropanesulfonic acid copolymer salt, isobutylene maleic anhydride copolymer salt, cross-linked carboxymethyl cellulose salts, and water-absorbent resins selected from the group consisting of one or more of the above products, with polyurethane having polyoxyethylene groups.

The electrical energy generating device according to the present invention further includes a casing having numerous apertures between the sheet cover and the water-absorbent sheet, wherein the casing shrouds the cell.

The water-absorbent sheet is preferably formed by a water-absorbent material having numerous apertures. With the use of the water-absorbent sheet, formed of a water-absorbent material, having numerous apertures, the water yielded on the oxygen electrode by reaction between oxygen, protons and electrons can be efficiently removed from the oxygen electrode. Moreover, oxygen in atmospheric air can be efficiently supplied to the oxygen electrode through these numerous apertures for reaction with protons and electrons. By the reaction between oxygen, protons and electrons, the water generated on the oxygen electrode can be efficiently vaporized off.

In the electrical energy generating device according to the present invention, the hydrogen electrode is a hydrogen electrode plate, the oxygen electrode is an oxygen electrode plate. The cell includes a hydrogen gas flow path plate, in which a number of apertures are formed by lattice, so that a first hydrogen electrode plate, a first proton conductor film and a first oxygen electrode plate are arrayed in an order thereof in one side of the hydrogen gas flow path plate and a second hydrogen electrode plate, a second proton conductor film and a second oxygen electrode plate are arrayed in an order thereof on another side of the hydrogen gas flow path plate.

Preferably, the first hydrogen electrode plate and the second hydrogen electrode plate are each formed a number of apertures by lattice. The first hydrogen electrode plate and the hydrogen gas flow path plate are arrayed so that each of the apertures formed in the first hydrogen electrode plate passes through the apertures formed in the hydrogen gas flow path plate, with a first hydrogen gas channel being formed therebetween. The second hydrogen electrode plate and the hydrogen gas flow path plate are arrayed so that each of the apertures formed in the second hydrogen electrode plate passes through the apertures formed in the hydrogen gas flow path plate, with a second hydrogen gas channel being formed therebetween.

With the electrical energy generating device according to the present invention, simply the first hydrogen electrode plate and the hydrogen gas flow path plate are arrayed so that each of the apertures formed in the first hydrogen electrode plate passes through the apertures formed in the hydrogen gas flow path plate, with a first hydrogen gas channel being formed therebetween, while the second hydrogen electrode plate and the hydrogen gas flow path plate are arrayed so that each of the apertures formed in the second hydrogen electrode plate passes through the apertures formed in the hydrogen gas flow path plate, with a second hydrogen gas channel being formed therebetween, so that the hydrogen gas may be contacted efficiently with the hydrogen electrode to improve the efficienlty in generating the electrical energy.

More preferably, with the electrical energy generating device of the present invention, the hydrogen electrode plate and the hydrogen gas flow path plate are arrayed so that at least a part of points of intersection of the lattice of the first hydrogen electrode plate is within the inside of the multiple apertures formed in the hydrogen gas flow path plate, and so that at least a part of points of intersections of the lattice of the hydrogen gas flow path plate is within the inside of the multiple apertures formed in the first hydrogen electrode plate, with the first hydrogen gas channel being formed therebetween, whereas the hydrogen electrode plate and the hydrogen gas flow path plate are arrayed so that at least part of points of intersection of the lattice of the second hydrogen electrode plate is within the inside of the multiple apertures formed in the hydrogen gas flow path plate and so that at least a part of points of intersections of the lattice of the hydrogen gas flow path plate is within the inside of the multiple apertures formed in the second hydrogen electrode plate, with the second hydrogen gas channel being formed therebetween.

With the electrical energy generating device of the present invention, the hydrogen electrode plate and the hydrogen gas flow path plate are arrayed so that at least a part of points of intersection of the lattice of the first hydrogen electrode plate is within the inside of the multiple apertures formed in the hydrogen gas flow path plate, and so that at least a part of points of intersections of the lattice of the hydrogen gas flow path plate is within the inside of the multiple apertures formed in the first hydrogen electrode plate, with the first hydrogen gas channel being formed therebetween, whereas the hydrogen electrode plate and the hydrogen gas flow path plate are arrayed so that at least part of points of intersection of the lattice of the second hydrogen electrode plate is within the inside of the multiple apertures formed in the hydrogen gas flow path plate and so that at least a part of points of intersections of the lattice of the hydrogen gas flow path plate is within the inside of the multiple apertures formed in the second hydrogen electrode plate, with the second hydrogen gas channel being formed therebetween. Thus, the apertures of the first hydrogen electrode plate, the points of intersection of the lattice of which are within the inside of the multiple apertures formed in the hydrogen gas flow path plate communicate with four apertures formed in the hydrogen gas flow path plate, the apertures of the hydrogen gas flow path plate, the points of intersection of the lattice of which are within the inside of the multiple apertures formed in the first hydrogen electrode plate, communicate with four apertures formed in the first hydrogen electrode plate, apertures of the second hydrogen gas flow path plate, the points of intersection of the lattice of which are within the inside of the multiple apertures formed in the hydrogen gas flow path plate, communicate with four apertures formed in the hydrogen gas flow path plate and the apertures of the hydrogen gas flow path plate, the points of intersection of the lattice of which are within the inside of the multiple apertures formed in the second hydrogen electrode plate, communicate with four apertures formed in the second hydrogen electrode plate. Since the hydrogen gas flows through the inside of the cell, along the surfaces of the first and second hydrogen electrode plates, as the gas is spread two-dimensionally, the hydrogen gas may be efficiently contacted with the hydrogen electrode to improve the efficiency in generating the electrical energy.

With the electrical energy generating device according to the present invention, it is preferable that at least part of the multiple apertures formed in the first hydrogen electrode plate and at least part of the multiple apertures formed in the hydrogen gas flow path plate are substantially of a same shape, while at least part of the multiple apertures formed in the second hydrogen electrode plate and at least part of the multiple apertures formed in the hydrogen gas flow path plate are substantially of a same shape.

At least part of the multiple apertures formed in the first hydrogen electrode plate and at least part of the multiple apertures formed in the hydrogen gas flow path plate are substantially of a same rectangular shape, while at least part of the multiple apertures formed in the second hydrogen electrode plate and at least part of the multiple apertures formed in the hydrogen gas flow path plate are substantially of a same rectangular shape.

By this configuration, the first and second hydrogen electrode plates and the hydrogen gas flow path plate may be machined easily, while the hydrogen gas may be efficiently and evenly contacted with the hydrogen electrode to improve the power generating efficiency.

With the electrical energy generating device according to the present invention, the hydrogen electrode plate and the hydrogen gas flow path plate arrayed so that at least part of points of intersection of the lattice of the first hydrogen electrode plate is coincident with center points of the multiple apertures formed in the first hydrogen electrode plate, and so that at least part of points of intersection of the lattice of the hydrogen gas flow path plate is coincident with center points of the multiple apertures formed in the first hydrogen electrode plate, with the first hydrogen gas channel being formed therebetween, whereas the hydrogen electrode plate and the hydrogen gas flow path plate are arrayed so that at least part of points of intersection of the lattice of the second hydrogen electrode plate is coincident with center points of the multiple apertures formed in the hydrogen gas flow path plate, and so that at least part of points of intersection of the lattice of the hydrogen gas flow path plate is coincident with center points of the multiple apertures formed in the second hydrogen electrode plate, with the second hydrogen gas channel being formed therebetween.

With the electrical energy generating device according to the present invention, the thickness of the hydrogen gas flow path plate is from of 0.01 mm to 1 mm, while the thickness of each of the first and second hydrogen electrode plates is from 0.01 mm to 1 mm.

The hydrogen gas flow path plate is formed of a material selected from the group consisting of polycarbonate, acrylic resin, ceramics, carbon, hastelloy, stainless steel, nickel, molybdenum, copper, aluminum, iron, silver, gold, platinum, tantalum and titanium.

The first and second hydrogen electrode plates are each formed of a material selected from the group consisting of hastelloy, stainless steel, nickel, molybdenum, copper, aluminum, iron, silver, gold, platinum, tantalum, titanium and alloys thereof.

With the electrical energy generating device according to the present invention, the first oxygen electrode plate and the second hydrogen electrode plate are each formed of a number of apertures by a lattice, and the cell further includes a first air flow path plate in which a number of apertures are formed by a lattice and a second air flow path plate in which a number of apertures are formed by a lattice. The surface of the first oxygen electrode plate opposite to the first proton conductor film and the first air flow path plate are arrayed so that each of the apertures formed in the first oxygen electrode plate passes through the apertures formed in the first air flow path plate and so that with a first air channel being formed therebetween, whereas the surface of the second oxygen electrode plate opposite to the second proton conductor film and the second air flow path plate are arrayed so that each of the apertures formed in the second oxygen electrode plate passes through the apertures formed in the second air flow path plate, with a second air channel being formed therebetween.

With the present electrical energy generating device, the first oxygen electrode plate and the second hydrogen electrode plate are each formed of a number of apertures by a lattice, the cell further includes a first air flow path plate in which a number of apertures are formed by a lattice and a second air flow path plate in which a number of apertures are formed by a lattice, the surface of the first oxygen electrode plate opposite to the first proton conductor film and the first air flow path plate are arrayed so that each of the apertures formed in the first oxygen electrode plate passes through the apertures formed in the first air flow path plate, with a first air channel being formed therebetween, whereas the surface of the second oxygen electrode plate opposite to the second proton conductor film and the second air flow path plate are arrayed so that each of the apertures formed in the second oxygen electrode plate passes through the apertures formed in the second air flow path plate, with a second air channel being formed therebetween. Thus, air may be allowed to flow through the inside of the cell, along the surfaces of the first and second hydrogen electrode plates, as the gas is spread two-dimensionally, so that the hydrogen gas may be efficiently contacted with the hydrogen electrode to improve the efficiency in generating the electrical energy. Moreover, the first oxygen electrode plate and the first air flow path plate are arrayed so that each of the apertures formed in the first oxygen electrode plate passes through the apertures formed in the first air flow path plate, with the first air channel being formed therebetween, while the second oxygen electrode plate and the first air flow path plate are arrayed so that each of the apertures formed in the second oxygen electrode plate passes through the apertures formed in the second air flow path plate, with the second air channel being formed therebetween. Thus, the hydrogen gas may be efficiently contacted with the hydrogen electrode to improve the efficiency in generating the electrical energy.

With the electrical energy generating device according to the present invention, the first oxygen electrode plate and the first air flow path plate arrayed so that at least part of points of intersection of the lattice of the first oxygen electrode plate is within the inside of the multiple apertures formed in the first air flow path plate, and so that at least part of points of intersection of the lattice of the first air flow path plate is within the multiple apertures formed in the first oxygen electrode plate, with the first air channel being formed therebetween, whereas the second oxygen electrode plate and the second air flow path plate are arrayed so that at least part of points of intersection of the lattice of the second oxygen electrode plate is within the inside of the multiple apertures formed in the second air flow path plate, and so that at least part of points of intersection of the lattice of the second air flow path plate is within the multiple apertures formed in the second oxygen electrode plate, with the second air channel being formed therebetween.

With the above-described electrical energy generating device, in which the first oxygen electrode plate and the first air flow path plate are arrayed so that at least part of points of intersection of the lattice of the first oxygen electrode plate is within the inside of the multiple apertures formed in the first air flow path plate, and so that at least part of points of intersection of the lattice of the first air flow path plate is within the multiple apertures formed in the first oxygen electrode plate, with the first air channel being formed therebetween, whereas the second oxygen electrode plate and the second air flow path plate are arrayed so that at least part of points of intersection of the lattice of the second oxygen electrode plate is within the inside of the multiple apertures formed in the second air flow path plate, and so that at least part of points of intersection of the lattice of the second air flow path plate is within the multiple apertures formed in the second oxygen electrode plate, with the second air channel being formed therebetween. Thus, the apertures of the first oxygen electrode plate, the points of intersection of the lattice of which are within the inside of the multiple apertures formed in the first air flow path plate, communicate with four apertures formed in the first air flow path plate, the apertures of the first air flow path plate, the points of intersection of the lattice of which are within the inside of the multiple apertures formed in the first oxygen electrode plate, communicate with four apertures formed in the first oxygen electrode plate, the apertures of the second oxygen electrode plate, the points of intersection of the lattice of which are within the inside of the multiple apertures formed in the second air flow path plate, communicate with four apertures formed in the second air flow path plate and the apertures of the second air flow path plate, the points of intersection of the lattice of which are within the inside of the multiple apertures formed in the second oxygen electrode plate, communicate with four apertures formed in the second oxygen electrode plate. Thus, the air may be allowed to flow through the inside of the cell, along the surfaces of the first and second hydrogen electrode plates, as the gas is spread two-dimensionally, so that the hydrogen gas may be efficiently contacted with the hydrogen electrode to improve the efficiency in generating the electrical energy.

Preferably, at least part of the multiple apertures formed in the first oxygen electrode plate and at least part of the multiple apertures formed in the first air flow path plate are substantially of a same shape, whereas at least part of the multiple apertures formed in the second oxygen electrode plate and at least part of the multiple apertures formed in the second air flow path forming plate are substantially of a same shape.

In a preferred embodiment of the present invention, at least part of the multiple apertures formed in the first oxygen electrode plate and at least part of the multiple apertures formed in the first air flow path plate are substantially of a same rectangular shape, whereas at least part of the multiple apertures formed in the second oxygen electrode plate and at least part of the multiple apertures formed in the second air flow path forming plate are substantially of a same rectangular shape. By this configuration, the first and second oxygen electrode plates and the first and second air flow path plates may be machined easily, while the oxygen gas may be efficiently and evenly contacted with the oxygen electrode to improve the power generating efficiency.

With the electrical energy generating device according to the present invention, the first oxygen electrode plate and the first air flow path plate are arrayed so that at least part of points of intersection of the lattice of the first oxygen electrode plate is coincident with center points of the multiple apertures formed in the first air flow path plate, and so that at least part of points of intersection of the lattice of the first air flow path plate is coincident with center points of the multiple apertures formed in the first oxygen electrode plate, with the first air channel being formed therebetween, whereas the second oxygen electrode plate and the second air flow path plate are arrayed so that at least part of points of intersection of the lattice of the second oxygen electrode plate is coincident with center points of the multiple apertures formed in the second air flow path plate, and so that at least part of points of intersection of the lattice of the lattice of the second air flow path plate is coincident with center points of the multiple apertures formed in the second oxygen electrode plate, with the second air channel being formed therebetween. By such configuration, the oxygen gas may be efficiently and evenly contacted with the oxygen electrode to improve the power generating efficiency.

A thickness of each of the first air flow path plate and the second air flow path plate is from 0.01 mm to 0.5 mm. A thickness of each of the first oxygen electrode plate and the second oxygen electrode plate is from 0.01 mm to 1 mm.

The first air flow path plate and the second air flow path plate are each formed of a material selected from the group consisting of polycarbinate, acrylic resin, ceramics, carbon, hastelloy, stainless steel, nickel, molybdenum, copper, aluminum, iron, silver, gold, platinum, tantalum and titanium.

The first and second oxygen electrode plates are each formed of a material selected from the group consisting of hastelloy, stainless steel, nickel, molybdenum, copper, aluminum, iron, silver, gold, platinum, tantalum, titanium and alloys thereof.

With the electrical energy generating device according to the present invention, the cell further includes a first module retention plate in which a number of apertures are formed by a lattice, on the opposite side of the first air flow path plate with respect to the first oxygen electrode plate, and a second module retention plate in which a number of apertures are formed by a lattice, on the opposite side of the second air flow path plate with respect to the second oxygen electrode plate. The first module retention plate and the first air flow path plate are arrayed so that each of the apertures formed in the first module retention plate passes through the apertures formed in the first air flow path plate, whereas the second module retention plate and the second air flow path plate are arrayed so that each of the apertures formed in the second module retention plate passes through the apertures formed in the second air flow path plate.

By such configuration, air can be evenly supplied to the first air flow channel, formed between the first air flow path plate and the first oxygen electrode plate from the multiple apertures provided in the first module retention plate, while air also can be evenly supplied to the second air flow channel, formed between the second air flow path plate and the second oxygen electrode plate from the multiple apertures provided in the second module retention plate, so that the oxygen gas may be efficiently contacted with the oxygen electrode to improve the efficiency in generating the electrical energy.

With the electrical energy generating device according to the present invention, the first module retention plate and the first air flow path plate are arrayed so that at least part of points of intersection of the lattice of the first module retention plate is within the inside of the multiple apertures formed in the first air flow path plate, and so that at least part of points of intersection of the lattice of the first air flow path plate is within the multiple apertures formed in the first module retention plate, whereas the second module retention plate and the second air flow path plate are arrayed so that at least part of points of intersection of the lattice of the second module retention plate is within the inside of the multiple apertures formed in the second air flow path plate, and so that at least part of points of intersection of the lattice of the second air flow path plate is within the multiple apertures formed in the second module retention plate.

By such configuration, the apertures of the first module retention plate, the points of intersection of the lattice of which are within the inside of the multiple apertures formed in the first air flow path plate, communicate with the four apertures formed in the first air flow path plate, the apertures of the first air flow path plate, the points of intersection of the lattice of which are within the inside of the multiple apertures formed in the first module retention plate, communicate with the four apertures formed in the first module retention plate, the apertures of the second module retention plate, the points of intersection of the lattice of which are within the inside of the multiple apertures formed in the second air flow path plate, communicate with the four apertures formed in the second air flow path plate, and the apertures of the second air flow path plate, the points of intersection of the lattice of which are within the inside of the multiple apertures formed in the second module retention plate, communicate with the four apertures formed in the second module retention plate. The result is that air can be evenly supplied from the multiple apertures provided in the first module retention plate to the first air channel formed between the first air flow path plate and the first oxygen electrode plate, while air can be evenly supplied from the multiple apertures provided in the second module retention plate to the second air channel formed between the second air flow path plate and the second oxygen electrode plate, so that the oxygen can be efficiently contacted with the oxygen electrode to improve the efficiently in generating the electrical energy.

It should be noted that at least part of the multiple apertures formed in the first module retention plate are formed to substantially a circular shape, whereas at least part of the multiple apertures formed in the second module retention plate are formed to substantially a circular shape.

Additional features and advantages of the present invention are described in, and will be apparent from, the following Detailed description of the Invention and the Figures.

DETAILED DESCRIPTION OF THE INVENTION

Figure 1:
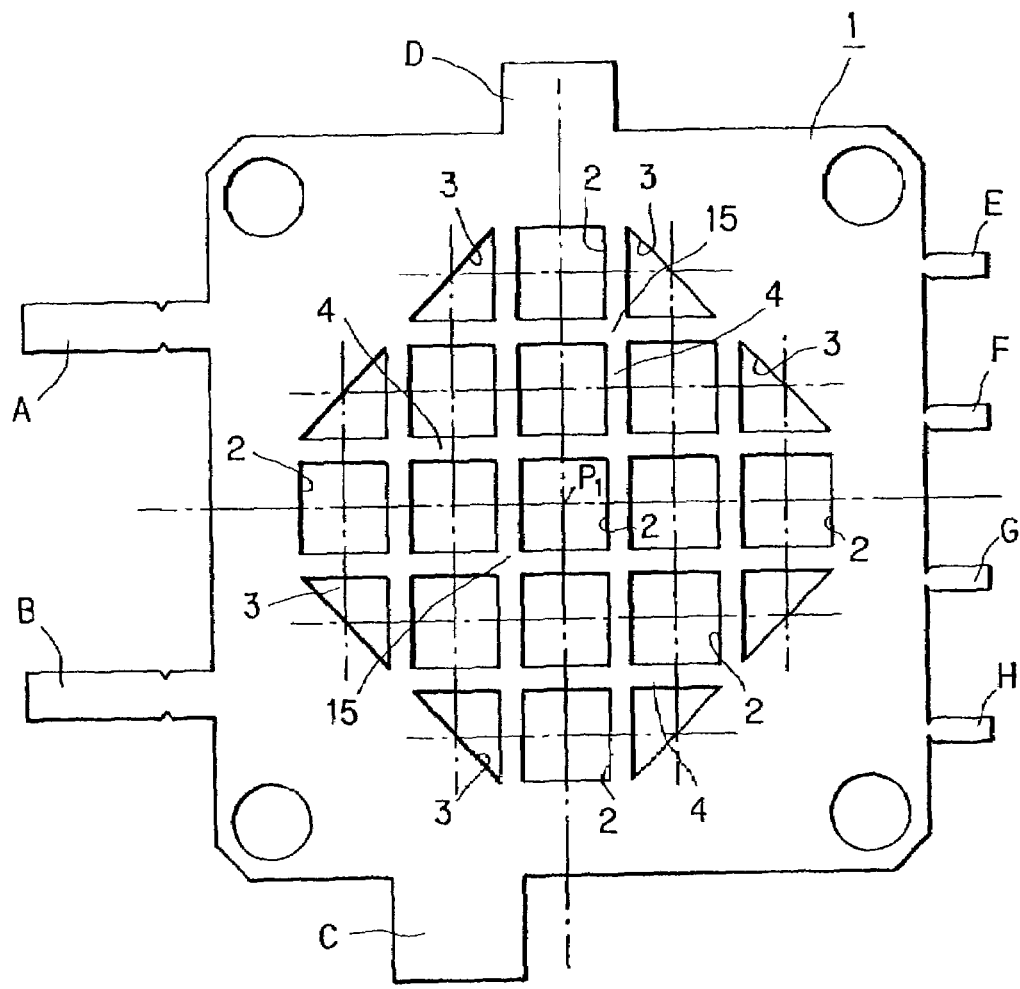
FIG. 1 is a schematic plan view showing a hydrogen electrode plate of a first unit electrical energy generating device constituting an electrical energy generating device according to the present invention.

An electrical energy generating device according to the present invention includes a first hydrogen electrode plate 1 configured as shown in FIG. 1. This first hydrogen electrode plate 1 is formed by a substantially square-shaped plate member formed of a stainless steel. The thickness of the plate member forming the hydrogen electrode plate 1 is set to 0.01 mm to 1.0 mm.

Referring to FIG. 1, the hydrogen electrode plate 1 is formed by a lattice 4 having a regular array of 13 square-shaped apertures 2 and eight triangular apertures 3. The eight triangular apertures 3 are arranged on the periphery, whereas, of the 13 square-shaped apertures 2, the central aperture 2 is formed in coincidence with the center point of the first hydrogen electrode plate 1.

In FIG. 1, A to H are pins for connection across the electrodes, and are formed each to a rectangular shape.

Figure 2:
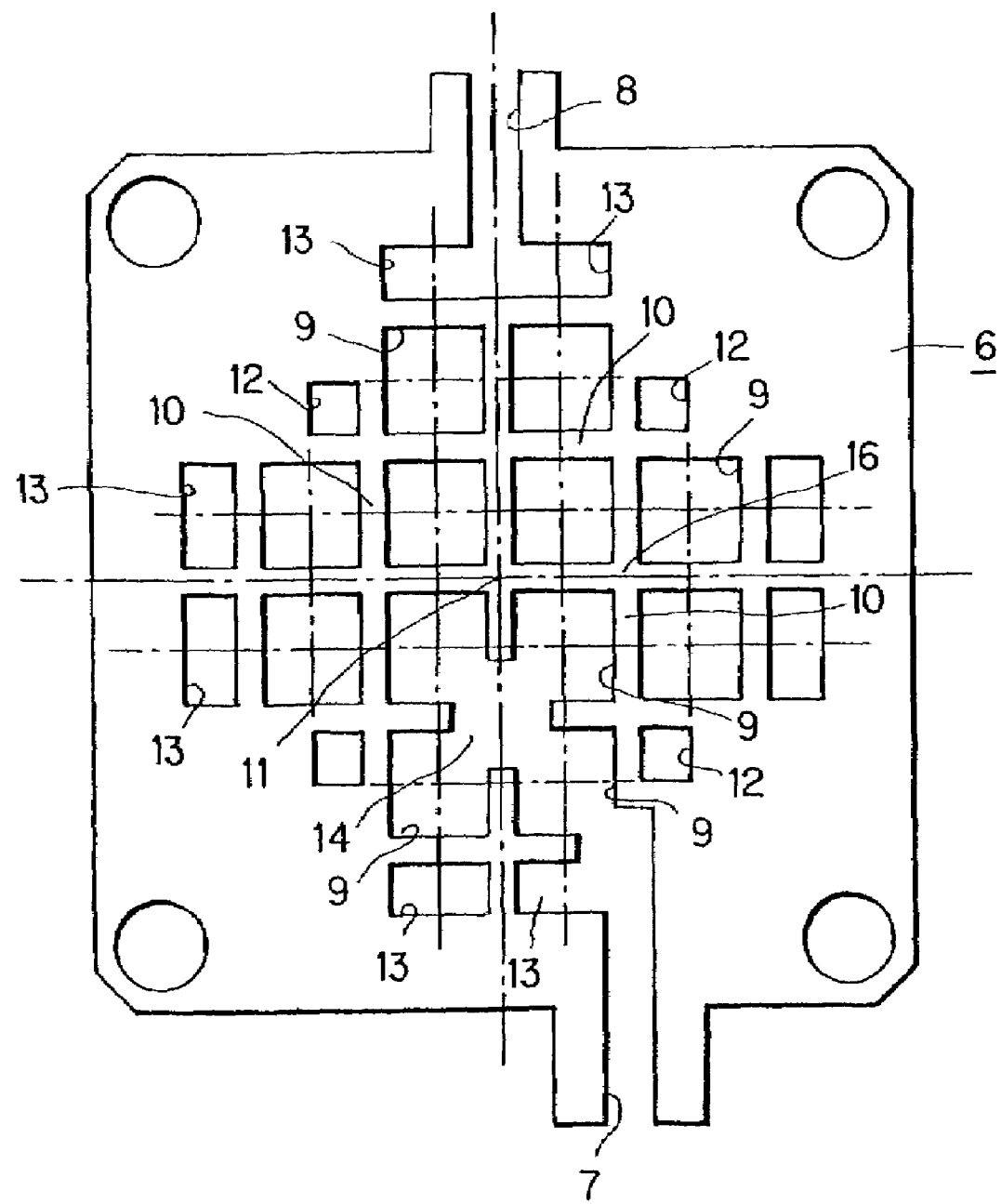
FIG. 2 is a schematic plan view showing a hydrogen gas flow path plate of the first unit electrical energy generating device constituting an electrical energy generating device according to the present invention.

A hydrogen gas flow path plate 6 of the first unit electrical energy generating device constituting the electrical energy generating device according to the present invention is formed by a substantially square-shaped plate member formed of polycarbonate, as shown in FIG. 2. In the present embodiment, the thickness of the plate member forming the hydrogen gas flow path plate 6 is set to 0.1 mm to 0.5 mm. However, the plate member having a thickness of 0.1 mm to 1.0 mm may be used for forming the hydrogen gas flow path plate 6.

In one end of the hydrogen gas flow path plate 6 is formed a first cut-out 7 forming a hydrogen gas supplying unit, whereas, in the opposite end thereof, a second cut-out 8 forming a hydrogen gas ejection unit is formed, as shown in FIG. 2. In the hydrogen gas flow path plate 6, there are formed 12 square-shaped apertures 9 to the same size by a lattice 10. Of the 12 square-shaped apertures 9, the square-shaped aperture 9 communicating with the first cut-out 7 and three square-shaped apertures 9 neighboring thereto have respective top corner portions cut out to provide for communication of the respective apertures with one another, so that a sole aperture 14 is formed by the four square-shaped apertures 9.

Referring to FIGS. 1 and 2, the square-shaped aperture 2 formed in the hydrogen electrode plate 1 and the square-shaped aperture 9 formed in the hydrogen gas flow path plate 6 are substantially of a same shape and size. The square-shaped aperture 2, formed centrally of the hydrogen electrode plate 1, has its center P1 formed in coincidence with the center point of the hydrogen electrode plate 1, while no aperture is formed centrally of the hydrogen gas flow path plate 6, but the square-shaped apertures 9 are formed in the hydrogen gas flow path plate 6 so that a point of intersection 11 of the lattice 10 forming the four centrally located square-shaped apertures 9 is in coincidence with the center P1 of the hydrogen gas flow path plate 6.

In the hydrogen gas flow path plate 6, four square-shaped apertures 12 of smaller size and eight rectangular apertures 13 are formed by the lattice 10, as shown in FIG. 2. Of the eight rectangular apertures 13, the two rectangular apertures 13, neighboring to the first cut-out 7, communicate with each other, while the sides thereof neighboring to the first cut-out 7 are cut out to provide for communication with the first cut-out 7. On the other hand, the rectangular aperture 13 neighboring to the second cut-out 8 has its side neighboring to the second cut-out 8 cut out to provide for communication with the second cut-out 8.

Figure 3:
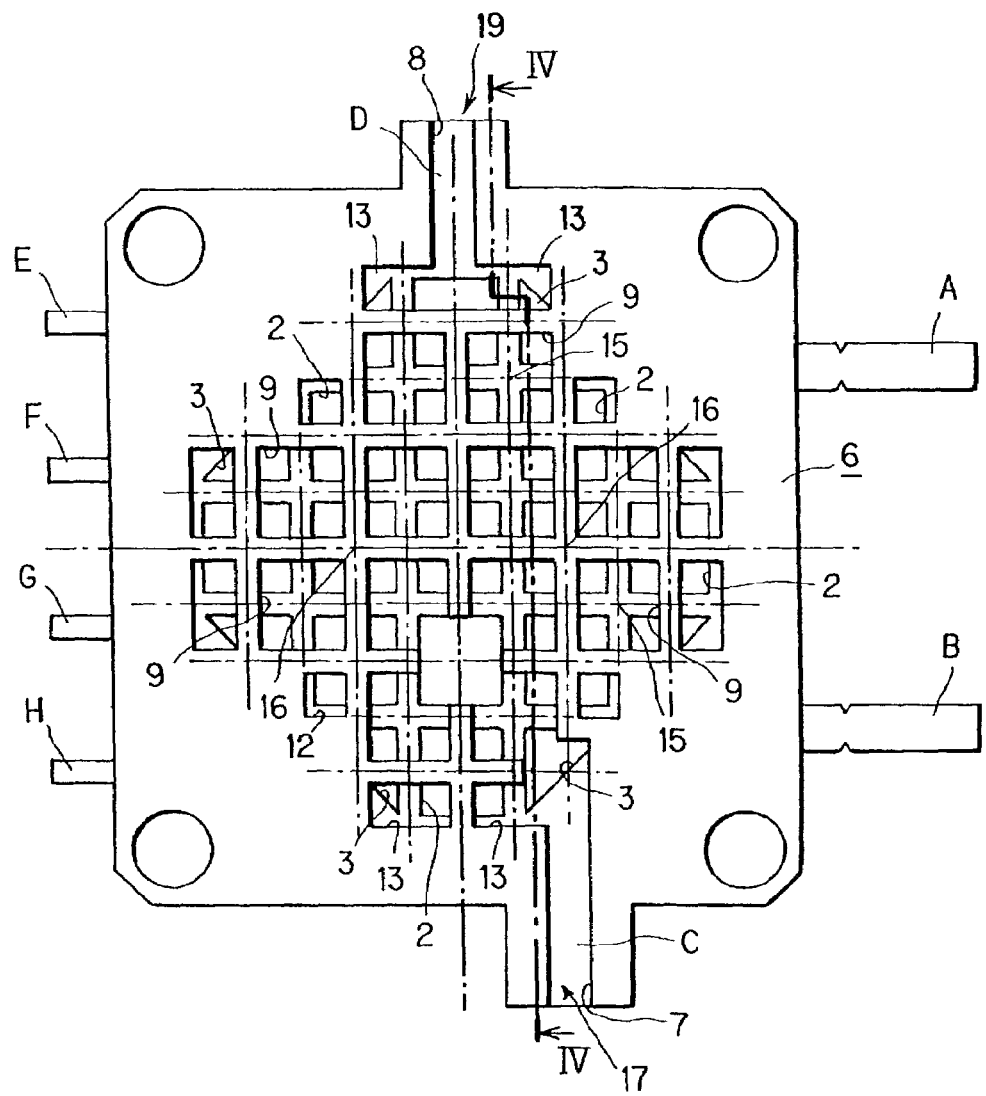
FIG. 3 is a schematic bottom plan view of a layered product obtained on laminating the first hydrogen electrode plate on the hydrogen electrode plate.
Figure 4:
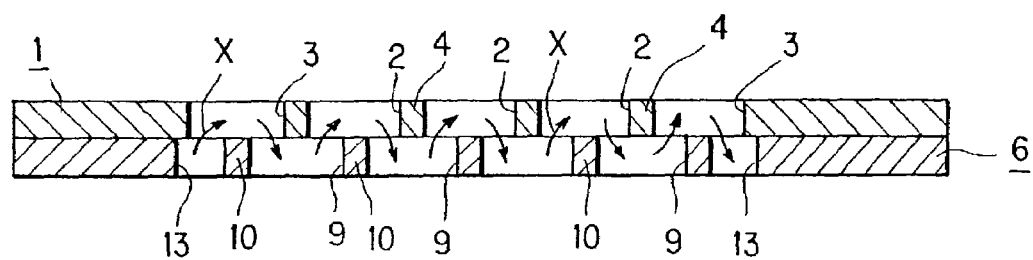
FIG. 4 is a schematic cross-sectional view taken along line IV to IV of FIG. 3.

On the hydrogen gas flow path plate 6 is superposed the hydrogen electrode plate 1, as shown in the bottom plan view of FIG. 3, to constitute a layered assembly. FIG. 4 is a schematic cross-sectional view taken along line IV—IV of FIG. 3.

The hydrogen gas flow path plate 6 is superposed on and tightly contacted to the hydrogen electrode plate 1, so that, when the hydrogen electrode plate 1 is superposed on the hydrogen gas flow path plate 6, the points of intersection 15 of the lattice 4 forming the square-shaped apertures 2 and the triangular apertures 3 of the hydrogen electrode plate 1 are in coincidence with the center point of the square-shaped apertures 9 formed in the hydrogen gas flow path plate 6, and so that the points of intersection 16 of the lattice 10 forming the small-sized square-shaped apertures 12 and the rectangular apertures 13 of the hydrogen gas flow path plate 6 are in coincidence with the center point of the square-shaped aperture 2 formed in the hydrogen electrode plate 1, as shown in FIG. 3.

The result is that, as shown in FIG. 3, the square-shaped apertures 2 formed in the hydrogen electrode plate 1, except the square-shaped aperture 2 at an upper end in FIG. 1, communicate with the square-shaped apertures 9, small-sized square-shaped apertures 12 and with four of the rectangular apertures 13 formed in the hydrogen gas flow path plate 6. In FIG. 1, only the square-shaped aperture 2 located at the upper end is in communication with the two neighboring square-shaped apertures 9 formed in the hydrogen gas flow path plate 6 and with two rectangular apertures 13 communicating with each other and with the first cut-out 7.

Each of the triangular apertures 3 formed in the hydrogen electrode plate 1 communicates with the square-shaped aperture 9 and with the rectangular apertures 13 formed in the hydrogen gas flow path plate 6, as shown in FIG. 3.

The square-shaped apertures 9 formed in the hydrogen gas flow path plate 6 communicate with the square-shaped apertures 2 and four of the triangular apertures 3 formed in the hydrogen electrode plate 1, while the small-size square-shaped apertures 12 formed in the hydrogen gas flow path plate 6 communicate with one of the square-shaped apertures 2 formed in the hydrogen electrode plate 1. The rectangular apertures 13 formed in the hydrogen gas flow path plate 6, except the two rectangular apertures 13 communicating with each other and with the first cut-out 7, communicate with both the square-shaped apertures 2 and the triangular apertures 3 formed in the hydrogen electrode plate 1. The two rectangular apertures 13, formed in the hydrogen gas flow path plate 6 and which are in communication with each other and with the first cut-out 7, communicate with one square-shaped aperture 2 and with the two triangular apertures 3 formed in the hydrogen electrode plate 1.

The electrical energy generating device according to the present invention is made up of first and second unit cells, as are explained subsequently. The hydrogen gas flow path plate 6 is used as a component common to the first and second unit cells. These first and second unit cells are plane-symmetrical, that is of the identical layer structure, with respect to the hydrogen gas flow path plate. The first hydrogen electrode plate 1 is tightly contacted to one surface of the hydrogen gas flow path plate 6, while a second hydrogen electrode plate, not shown, is tightly contacted to the opposite side surface of the hydrogen gas flow path plate 6.

Thus, the apertures 9, 12, 13 of the hydrogen gas flow path plate 6 are closed by the first hydrogen electrode plate 1 and by the second hydrogen gas flow path plate. A hydrogen gas supply unit 17 is formed by the second hydrogen electrode plate, hydrogen gas flow path plate 6 and by the first hydrogen electrode plate 1, while a hydrogen gas ejection unit 19 is formed by the second hydrogen electrode plate, hydrogen gas flow path plate 6, the first hydrogen electrode plate 1 and by the second cut-out 8 of the hydrogen gas flow path plate 6.

The hydrogen gas supply unit 17 is connected to a hydrogen gas supply source, not shown, having a hydrogen occlusive material, such as a hydrogen occlusive carbonaceous material or a hydrogen occlusive alloy.

The first hydrogen electrode plate 1 and the hydrogen gas flow path plate 6 are tightly contacted to each other, as shown in FIG. 3, while the second hydrogen plate is tightly contacted to the side of the hydrogen gas flow path plate 6 opposite to its side carrying the first hydrogen electrode plate 1. Thus, the hydrogen gas, supplied from the hydrogen gas supplying unit 17 into the inside of the electrical energy generating device, first flows through the rectangular apertures 13 formed in the hydrogen gas flow path plate 6 into the square-shaped aperture 2 and two triangular apertures 3, formed in the hydrogen electrode plate 1, then flows from the square-shaped aperture 2 formed in the hydrogen electrode plate 1 into two neighboring square-shaped apertures 9 formed in the hydrogen gas flow path plate 6, and from the triangular apertures 3 formed in the hydrogen electrode plate 1 into the square-shaped apertures 9 formed in the hydrogen gas flow path plate 6, as indicated by arrow x in FIG. 4.

The hydrogen gas supplied into the square-shaped aperture 9 formed in the hydrogen gas flow path plate 6 further flows into the two neighboring square-shaped apertures 2 formed in the hydrogen electrode plate 1. The hydrogen gas supplied to the neighboring square-shaped apertures 2 formed in the hydrogen electrode plate 1 flows into two neighboring square-shaped apertures 9 formed in the hydrogen gas flow path plate 6 and into the small-sized square-shaped apertures 12 formed in the hydrogen gas flow path plate 6 or into the two neighboring square-shaped apertures 9 formed in the hydrogen gas flow path plate 6.

So, the hydrogen gas, supplied from the hydrogen gas supplying unit 17 into the inside of the electrical energy generating device, flows through a space between the first hydrogen electrode plate 1 and the hydrogen gas flow path plate 6, as it is spread two-dimensionally, until it is ejected through the hydrogen gas ejection unit 19 to outside the electrical energy generating device. Thus, the hydrogen gas can be brought efficiently into contact with the hydrogen electrode plate 1.

Figure 5:
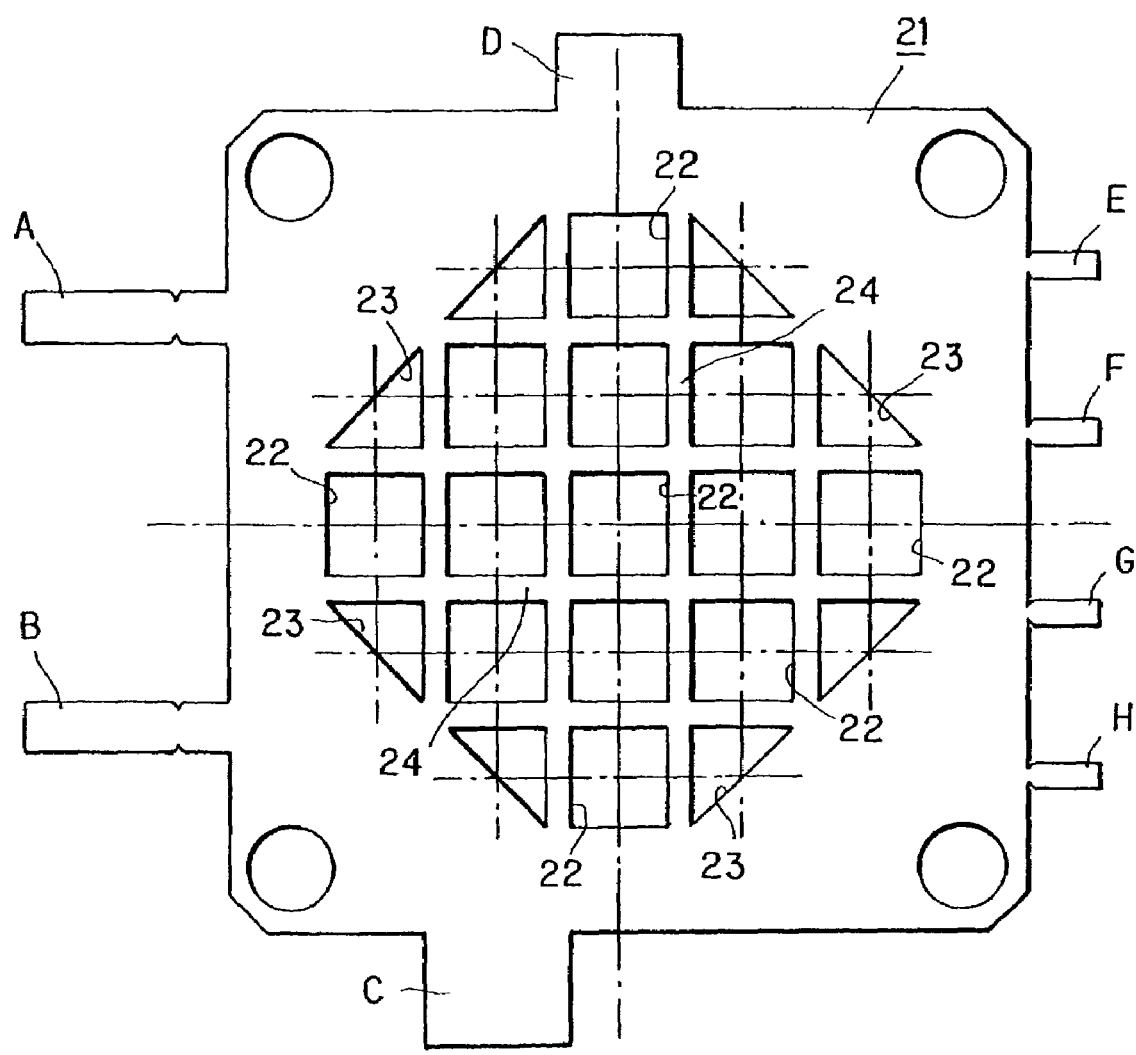
FIG. 5 is a schematic plan view showing a first oxygen electrode plate of a first unit cell forming the electrical energy generating device according to the present invention.

A first oxygen electrode plate 21 of the first unit electrical energy generating device, forming the electrical energy generating device of the present invention, is formed in the same way as the hydrogen electrode plate 1, as shown in FIG. 5, and is formed by a substantially square-shaped plate member of stainless steel. It is noted that the plate member forming the oxygen electrode plate 21 is set to a thickness of 0.01 mm to 1.0 mm.

In the oxygen electrode plate 21, there are formed 13 square-shaped apertures 22 and eight triangular apertures 23 in a regular array by a lattice 24, as shown in FIG. 5. The triangular apertures 23 are formed in the peripheral area, whereas, of the 13 square-shaped apertures 22, arranged in a mid portion of the oxygen electrode plate 21, the central aperture 22 has its center in meeting with the center point of the first oxygen electrode plate 21.

In FIG. 5, A to H are electrode interconnecting pins and are each in a rectangular shape.

Figure 6:
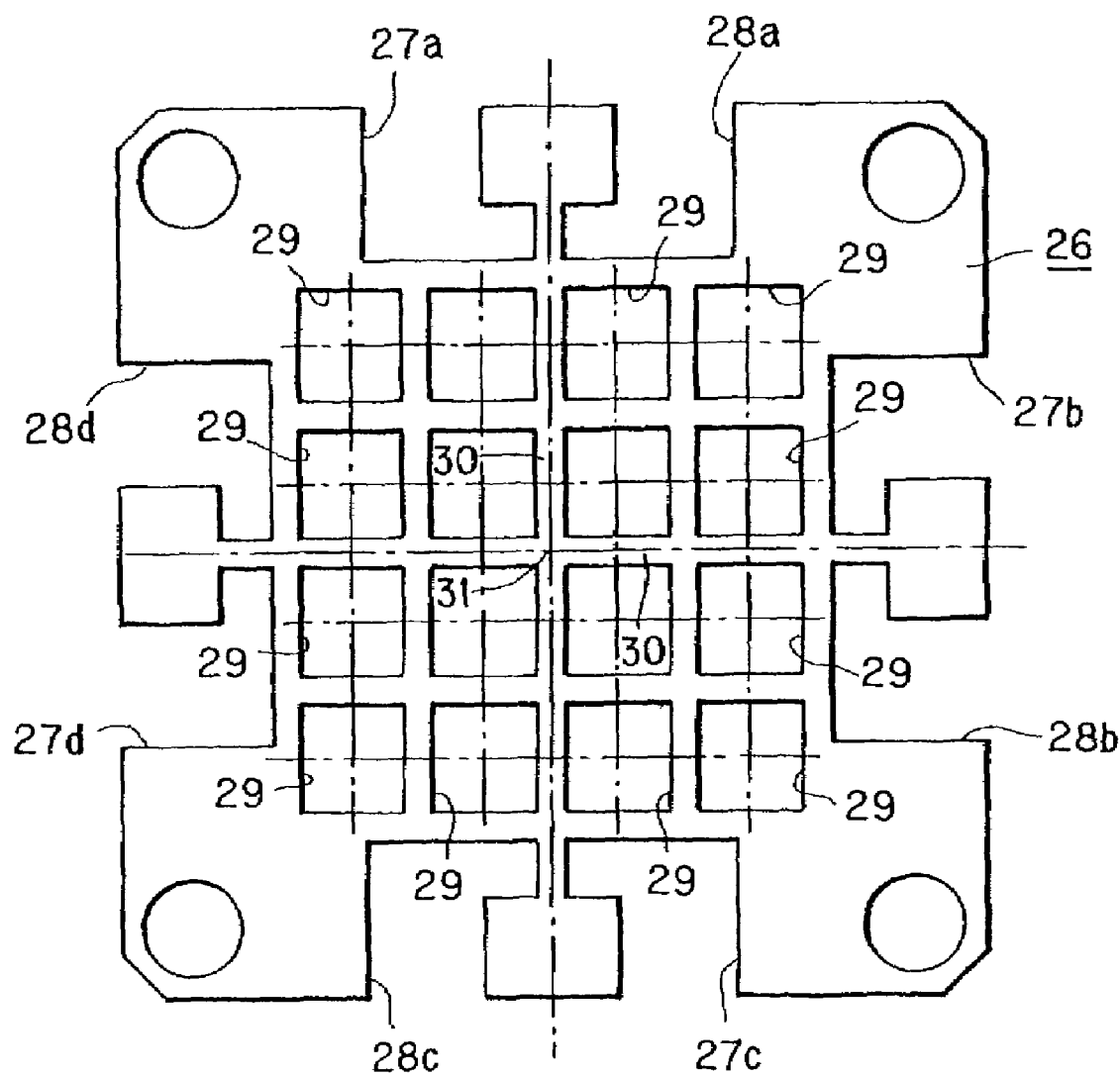
FIG. 6 is a schematic plan view showing the first air flow path plate of the first unit electrical energy generating device first constituting an electrical energy generating device according to the present invention.

A first air flow path plate 26 of the first unit electrical energy generating device, forming the electrical energy generating device according to the present invention, is formed by a substantially square-shaped plate member of polycarbonate, and has cut-outs 27a, 28a, 27b, 28b, 27c, 28c, 27d, 28d, at two positions in each side of the plate member, as shown in FIG. 6. The objective of forming the cut-outs 27a, 28a, 27b, 28b, 27c, 28c, 27d, 28d at the two positions in each side of the air flow path plate 26 is to facilitate air intake from the peripheral portions of the air flow path plate 26. The plate member forming the air flow path plate 26 is set to a thickness of 0.01 m to 0.5 mm.

The air flow path plate 26 is formed with 16 square-shaped apertures 29, as shown in FIG. 6. The square-shaped aperture 22 formed in the oxygen electrode plate 21 and the square-shaped aperture 29 formed in the air flow path plate 26 are of the same size, with the square-shaped aperture 22 formed in the mid portion of the oxygen electrode plate 21 having its center in coincidence with the center point of the first oxygen electrode plate 21. However, no aperture are provided in the center point of the air flow path plate 26, but the 16 square-shaped apertures 29 are formed in the air flow path plate 26 so that a point of intersection 31 of the square-shaped apertures of the lattice 30 forming the four square-shaped apertures 29 formed at the mid portion of the plate member are coincident with the center point of the first air flow path plate 26.

Figure 7:
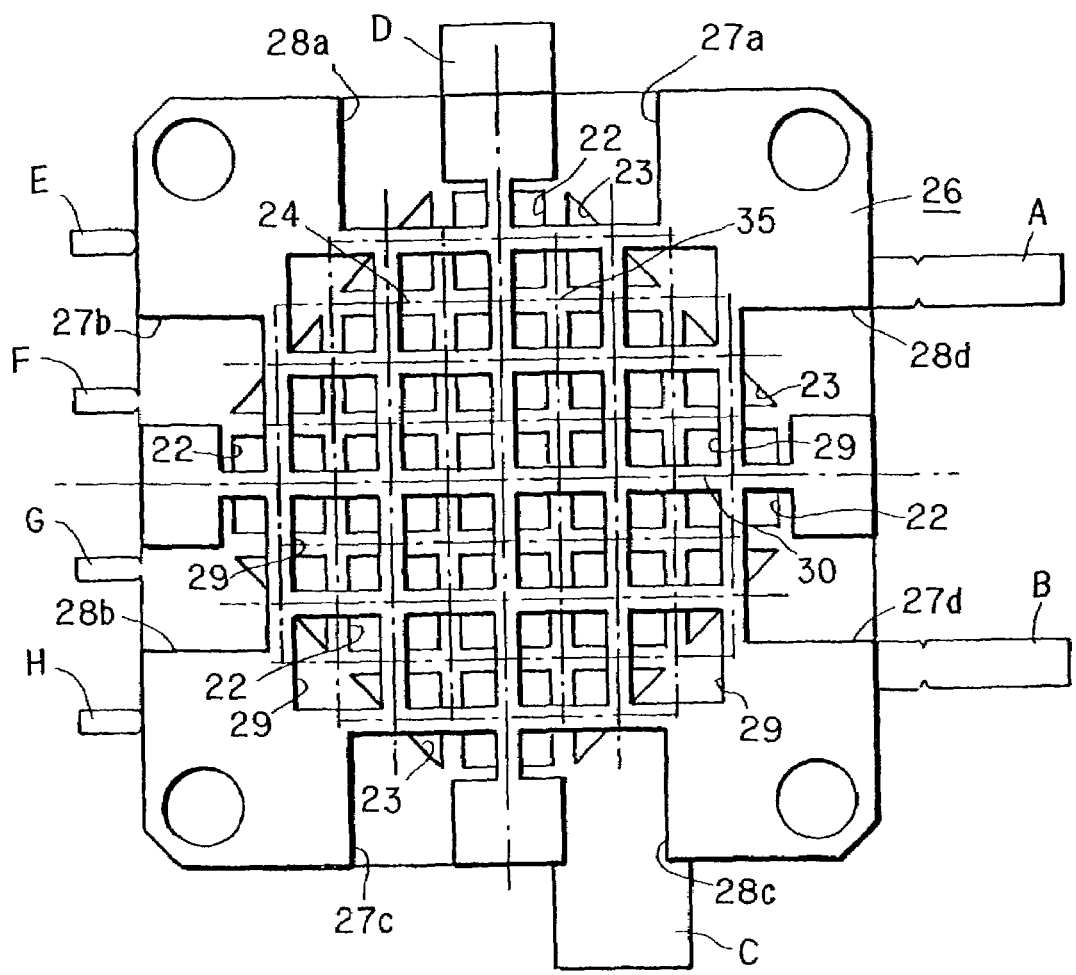
FIG. 7 is a bottom plan view of a layered product on laminating the first air flow path plate on the first oxygen electrode plate.

On the oxygen electrode plate 21 is superposed the first air flow path plate 26, as shown in the bottom plan view of FIG. 7, to form a layered assembly, as shown in FIG. 7.

Referring to FIG. 7, the air flow path plate 26 is superposed on and tightly contacted to the oxygen electrode plate 21, so that the points of intersection 35 of the lattice 24 forming the square-shaped apertures 22 and the triangular apertures 23 of the first oxygen electrode plate 21 are coincident with the center point of the square-shaped apertures 29 formed in the air flow path plate 26, and so that the points of intersection 36 of the lattice 30 forming the square-shaped apertures 20 formed in the first air flow path plate 26 are coincident with the center point of the square-shaped apertures 22 formed in the oxygen electrode plate 21.

The result is that the square-shaped apertures 22 formed in the oxygen electrode plate 21, except the square-shaped apertures 22 at the upper and lower left and right ends, are in communication with the four reciprocally neighboring square-shaped apertures 29 formed in the air flow path plate 26, while the apertures 29 positioned at the upper end are in communication with the two neighboring square-shaped apertures 29 and the cut-outs 27a, 28a formed in the air flow path plate 26. The apertures 29 positioned at the right end communicate with the two mutually neighboring square-shaped apertures 29 and the cut-outs 27b, 28b formed in the air flow path plate 26. The apertures 29 positioned at the lower end communicate with the two mutually neighboring square-shaped apertures 29 and with the cut-outs 27c, 28c, formed in the air flow path plate 26, while the apertures 29 positioned at the left end communicate with the two mutually neighboring square-shaped apertures 29 and the cut-outs 27d, 28d formed in the first air flow path plate 26.

Moreover, the triangular apertures 23 formed in the oxygen electrode plate 21 are in communication with the two mutually neighboring square-shaped apertures 29 and the cut-outs 27a, 28a, 27b, 28b, 27c, 28c, 27d, 28d formed in the air flow path plate 26.

Of the square-shaped apertures 29, formed in the air flow path plate 26, the four apertures 29 formed at the mid portions of the air flow path plate 26 communicate with four mutually neighboring square-shaped apertures 22 formed in the oxygen electrode plate 21. The four square-shaped apertures 29 at the four corners in FIG. 6 are in communication with the one square-shaped aperture 22 and with two triangular apertures 23, formed in the oxygen electrode plate 21, with the remaining square-shaped apertures 29 formed in the first air flow path plate 26 being in communication with the three neighboring square-shaped apertures 22 and with the two triangular apertures 23 formed in the first oxygen electrode plate 21.

On the other hand, the cut-outs 27a, 28a, 27b, 28b, 27c, 28c, 27d, 28d, formed in the air flow path plate 26, are each in communication with the one square-shaped aperture 22 and with one triangular aperture 23 formed in the oxygen electrode plate 21.

Figure 8:
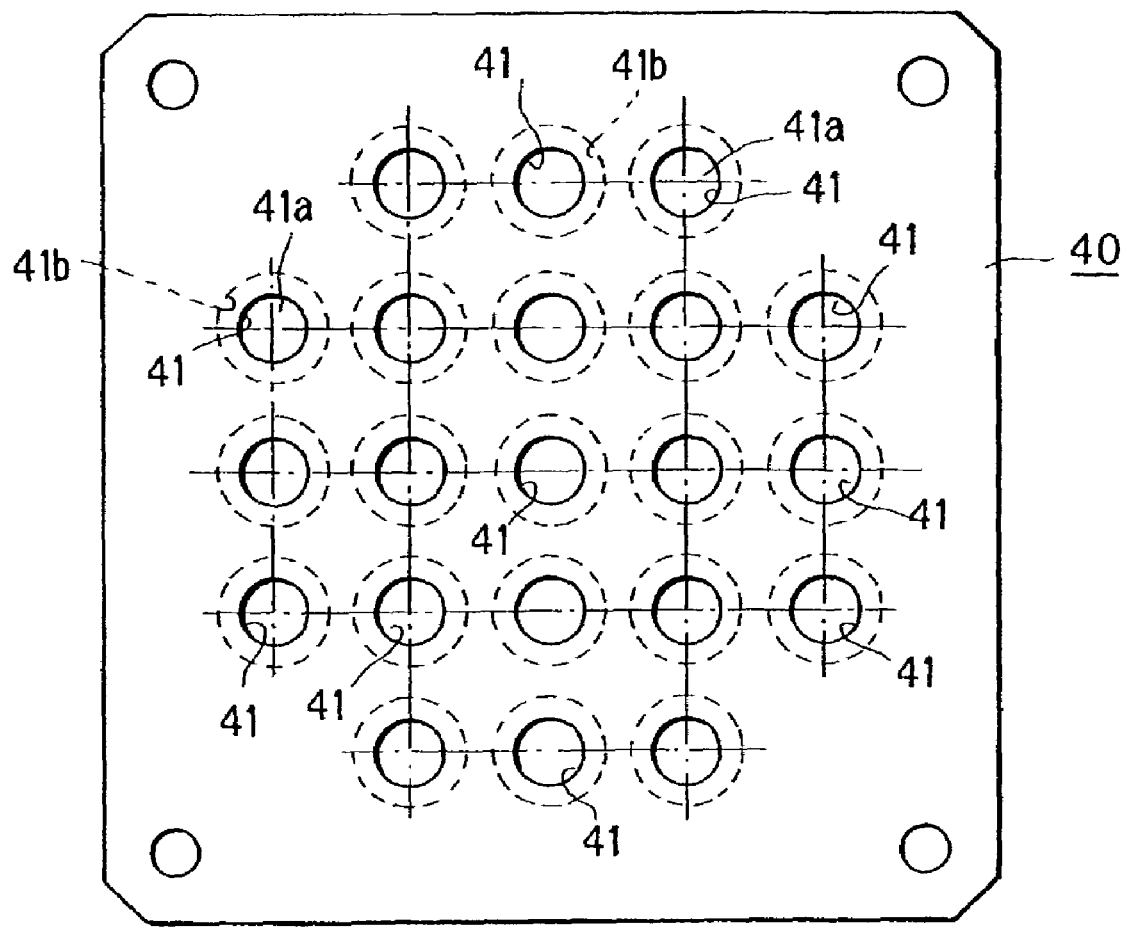
FIG. 8 is a plan view showing a module retention plate of the first unit electrical energy generating device constituting an electrical energy generating device according to the present invention.

A first module retention plate 40 of the first unit cell forming the electrical energy generating device of the present invention is rectangular in profile, as shown in FIG. 8, and is formed with 21 circular apertures 41 in a regular array. Each circular aperture 41 has a small-diameter portion 41a and a tapered portion 41b, having its inner wall section tapered so that its diameter is increased progressively. The first module retention plate 40 is mounted on the air flow path plate 26 in tight contact therewith so that the tapered portion 41b are positioned towards the air flow path plate 26.

Figure 9:
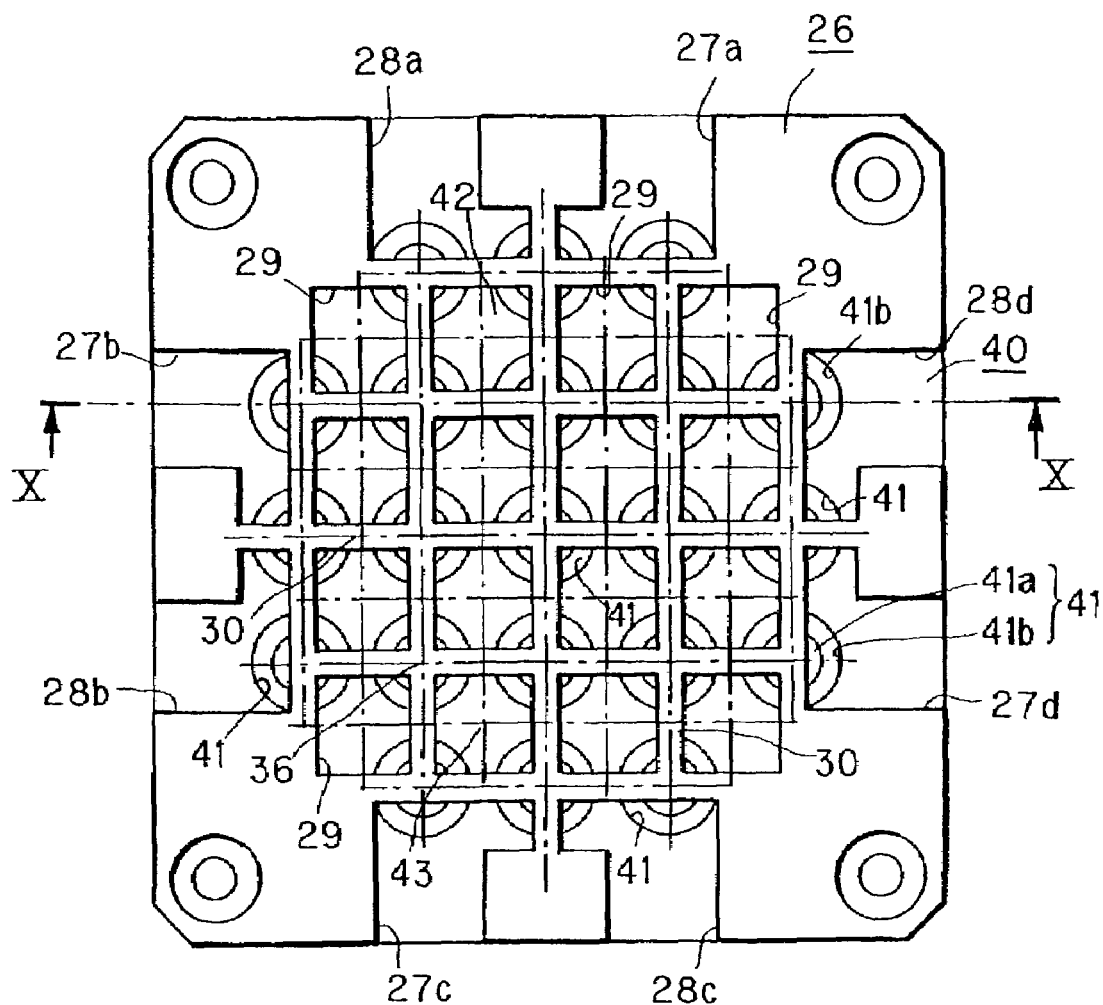
FIG. 9 is a schematic bottom plan view showing a layered product formed on tightly contacting the first module retention plate to the first air flow path plate.
Figure 10:
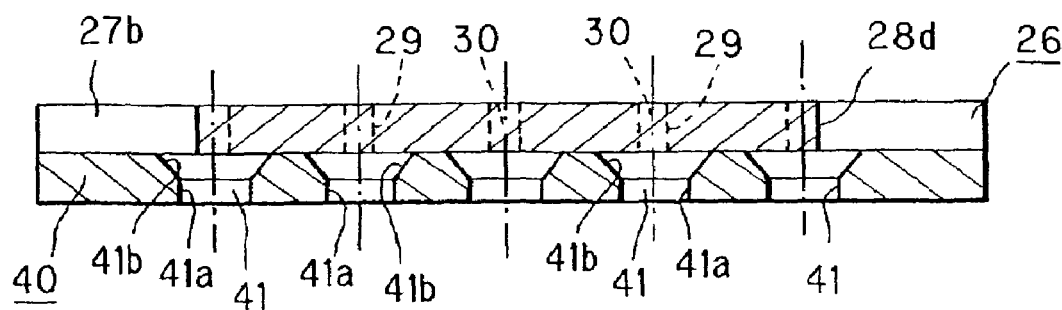
FIG. 10 is a schematic cross-sectional view taken along line X—X of FIG. 9.

The first module retention plate 40 is superposed on and tightly contacted to the first air flow path plate 26 to form a layered assembly, as shown in the bottom plan view of FIG. 9. FIG. 10 shows a cross-sectional view taken along line X—X in FIG. 9.

Referring to FIGS. 9 and 10, the first module retention plate 40 is tightly contacted to the first air flow path plate 26 so that the center points of the circular apertures 41 formed in the first module retention plate 40 are coincident with the points of intersection 36 of the lattice 30 forming the square-shaped apertures 29 of the first air flow path plate 26 and so that the points of intersection 43 of a lattice 42 forming the circular apertures 41 of the module retention plate 40 are coincident with the center points of the square-shaped apertures 29 formed in the first air flow path plate 26.

The result is that, as shown in FIG. 9, of the circular apertures 41 formed in the module retention plate 40, the nine centrally located apertures 41 communicate with the reciprocally neighboring four square-shaped apertures 29 formed in the first air flow path plate 26.

Referring now to FIG. 10, the circular aperture 41 located at the upper mid portion communicates with the two mutually neighboring square-shaped apertures 29 and the cut-outs 27a, 28a, formed in the first air flow path plate 26, while the circular aperture 41 located at the right mid portion communicates with the two mutually neighboring square-shaped apertures 29 and the cut-outs 27d, 28d, formed in the first air flow path plate 26, with the circular aperture 41 located at the lower mid portion communicating with the two mutually neighboring square-shaped apertures 29 and the cut-outs 27c, 28c, formed in the air flow path plate 26, and with the circular aperture 41 located at the left mid portion communicating with the two mutually neighboring square-shaped apertures 29 and the cut-outs 27b, 28b, formed in the first air flow path plate 26.

Referring to FIG. 9, the remaining circular apertures 41, formed in the first module retention plate 40, communicate with the two mutually neighboring square-shaped apertures 29 and with the cut-outs 27a, 28a, 27b, 28b, 27c, 28c, 27d or 28d formed in the first air flow path plate 26.

Figure 11:
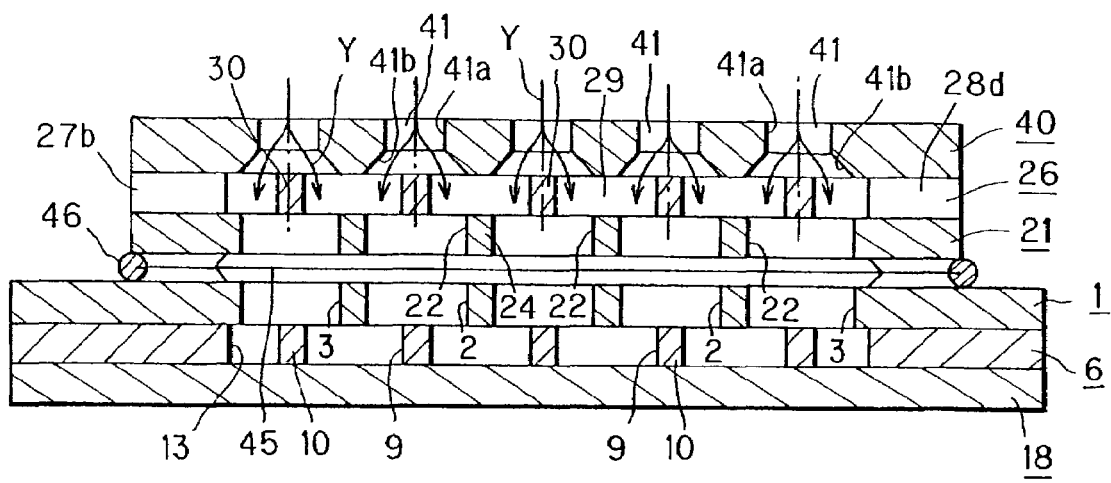
FIG. 11 is a schematic cross-sectional view showing the state of communication between an aperture formed in the first hydrogen gas flow path plate of the first unit cell forming the electrical energy generating device according to the present invention and an aperture formed in the first hydrogen electrode plate and the state of communication between an aperture formed in the oxygen electrode plate, an aperture formed in the air flow path plate and an aperture formed in a first module retention plate according to the present invention.

FIG. 11 shows a schematic cross-sectional view showing the state of communication between the apertures 9, 12 and 13, formed in the hydrogen gas flow path plate 6, and the apertures 2, 3, formed in the hydrogen electrode plate 1, in the electrical energy generating device according to the present invention, and the state of communication between the apertures 22, 23 formed in the oxygen electrode plate 21, the apertures 29 formed in the air flow path plate 26 and the apertures 41 formed in the module retention plate 40.

Referring to FIG. 11, the unit electrical energy generating device forming the electrical energy generating device according to the present invention includes a hydrogen gas flow path plate 6, a hydrogen electrode plate 1, a proton conductor film 45 through which protons yielded on dissociation of hydrogen supplied to the hydrogen electrode plate 1 can be permeated, under the action of a catalyst contained in the hydrogen electrode plate 1, an oxygen electrode plate 21, a first air flow path plate 26 and a first module retention plate 40, layered in this order.

Specifically, the first hydrogen electrode plate 1 is tightly contacted with and secured to the hydrogen gas flow path plate 6.

The first proton conductor film 45 then is layered on and tightly contacted to the first hydrogen electrode plate 1, while the first oxygen electrode plate 21 is layered on and tightly contacted to the first proton conductor film 45.

The first air flow path plate 26 is also tightly contacted and layered onto the first oxygen electrode plate 21, while the first module retention plate 40 is tightly contacted and layered onto the first air flow path plate 26.

The peripheral portions of the first proton conductor film 45 are sealed with a sealing member 46, as shown in FIG. 11.

With the electrical energy generating device of the present invention, constructed as described above, the hydrogen gas, supplied from the hydrogen gas supplying unit 17 into the inside of the electrical energy generating device, flows through a space between the first hydrogen electrode plate 1 and the hydrogen gas flow path plate 6, as it is spread two-dimensionally, and as it repeatedly contacts the hydrogen electrode plate 1, as described above, until it is ejected through the hydrogen gas ejection unit 19 to outside the first unit cell.

The hydrogen supplied to the hydrogen electrode plate 1 is dissociated into protons and electrons, by the action of the catalyst contained in the first hydrogen electrode plate 1, with the electrons being absorbed by the first hydrogen electrode plate 1 and with the protons being sent through the first proton conductor film 45 to the first oxygen electrode plate 26. The electrons absorbed by the hydrogen electrode plate 1 are sent through a load, not shown, to the first oxygen electrode plate 26.

There is supplied air into the inside of the first unit cell, through each of the circular apertures 41 formed in the module retention plate 40, as indicated by arrow Y in FIG. 11.

The air supplied to the nine apertures 41, formed in a mid portion of the module retention plate 40, flows into four reciprocally neighboring square-shaped apertures 29 formed in the first air flow path plate 26.

In FIG. 10, the air supplied to the circular aperture 41 formed at an upper mid portion flows into two mutually neighboring square-shaped apertures 29 and the cut-outs 27a, 28a formed in the first air flow path plate 26, while the air supplied to the circular aperture 41 formed at the mid left end portion flows into two mutually neighboring square-shaped apertures 29 and into the cut-outs 27b, 28b formed in the first air flow path plate 26.

Also, in FIG. 10, the air supplied to the circular aperture 41 formed at a lower mid portion flows into two mutually neighboring square-shaped apertures 29 and the cut-outs 27c, 28c, formed in the first air flow path plate 26, while the air supplied to the circular aperture 41 formed at a mid right end portion flows into two mutually neighboring square-shaped apertures 29 and the cut-outs 27d, 28d formed in the air first flow path plate 26.

The air supplied to the remaining circular apertures 41 formed in the module retention plate 40 flows into two mutually neighboring square-shaped apertures 29 and the cut-outs 27a, 28a, 27b, 28b, 27c, 28c, 27d, 28d formed in the first air flow path plate formed in the first air flow path plate 26.

That is, of the air flowing into the square-shaped apertures 29 formed in the first air flow path plate 26, the air flowing into the four apertures 29 in the mid portion flows into four reciprocally neighboring apertures 22 formed in the first oxygen electrode plate 21, while the air flowing into the four mutually neighboring square-shaped aperture 29 at the four corners in FIG. 6 flows into one square-shaped aperture 22 and into two triangular apertures 23 formed in the first oxygen electrode plate 21.

On the other hand, the air flowing into the remaining square-shaped apertures 29 formed in the first air flow path plate 26 flows into reciprocally neighboring three square-shaped apertures 22 and into two triangular apertures 23 formed in the first oxygen electrode plate 21.

The air flowing into the cut-outs 27a, 28a, 27b, 28b, 27c, 28c, 27d, 28d formed in the first air flow path plate 26 flows into one square-shaped aperture 22 and into one triangular aperture 23 formed in the first oxygen electrode plate 21.

The air also flows from the cut-outs 27a, 28a, 27b, 28b, 27c, 28c, 27d, 28d formed in two positions in each side of the first air flow path plate 26 into the square-shaped apertures 22 and into the triangular apertures 23 formed in the first oxygen electrode plate 21.

In this manner, the air is supplied through the apertures 41 formed in the first module retention plate 40 into the aperture 29 and into the cut-outs 27a, 28a, 27b, 28b, 27c, 28c, 27d, 28d, formed in the first air flow path plate 26, while being supplied from the cut-outs 27a, 28a, 27b, 28b, 27c, 28c, 27d, 28d, formed in two positions in each side of the first air flow path plate 26, into the square-shaped apertures 22 and into the triangular apertures 23 formed in the first oxygen electrode plate 21.

The result is that oxygen contained in the air is absorbed in the first hydrogen electrode plate 1 and is combined with electrons routed to the first oxygen electrode plate 21 through a load, not shown, and with protons routed to the first oxygen electrode plate 26 through the proton conductor film 45, thus yielding water.

So, the electromotive force is produced across the hydrogen electrode plate 1 and the first oxygen electrode plate 26 to cause current to flow in the load.

Figure 12:
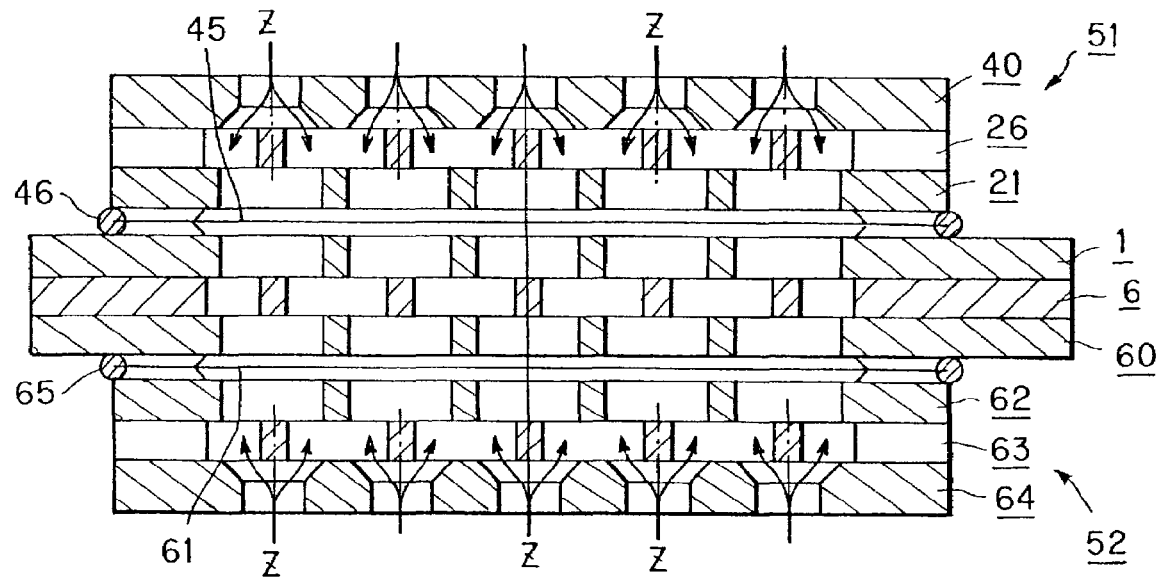
FIG. 12 is a longitudinal cross-sectional view of the electrical energy generating device according to the present invention, showing the state of communication between respective constituent elements of the electrical energy generating device.

FIG. 12 shows a modification of the electrical energy generating device according to the present invention. FIG. 12 is a cross-sectional view showing a modification of the present invention and shows the state of communication between the respective components making up the electrical energy generating device.

Referring to FIG. 12, the electrical energy generating device of the present embodiment includes a first unit cell 51 and a second unit cell 52, layered together.

Referring to FIG. 12, the first unit cell 51 includes a hydrogen gas flow path plate 6, a first hydrogen electrode plate 1, a first proton conductor film 45, an first oxygen electrode plate 21, a first air flow path plate 26 and a first module retention plate 40, layered in this order from below, while the second unit cell 52 includes a hydrogen gas flow path plate 6, a second hydrogen electrode plate 60, a second proton conductor film 61, a second oxygen electrode plate 62, a second air flow path plate 63 and a second module retention unit 64, layered in this order from above. In FIG. 12, 65 denotes a sealing member.

In the present electrical energy generating device, the second hydrogen electrode plate 60, second proton conductor film 61, second oxygen electrode plate 62, second air flow path plate 63 and the second module retention unit 64, forming the second unit cell 52, are formed in the same way as the first hydrogen electrode plate 1, first proton conductor film 45, first oxygen electrode plate 21, first air flow path plate 26 and the first module retention plate 40 making up the first unit cell 51. The second hydrogen electrode plate 60, second proton conductor film 61, second oxygen electrode plate 62, second air flow path plate 63 and the second module retention unit 64 are layered together so that the relative disposition of the second hydrogen electrode plate 51 and the hydrogen gas flow path plate 6, the relative disposition of the first oxygen electrode plate 53 and the second air flow path plate 54 and the relative disposition of the second air flow path plate 54 and the second module retention plate 55 are the same as the relative disposition of the first hydrogen electrode plate 1 and the hydrogen gas flow path plate 6, the relative disposition of the first oxygen electrode plate 21 and the first air flow path plate 26 and the relative disposition of the first air flow path plate 26 and the first module retention plate 40, in the first unit cell 51, respectively.

In the present embodiment of the electrical energy generating device, the first and second unit cells 51, 52 can be coupled to each other in an optional fashion to form an electrical energy generating device by selectively severing or leaving intact the pins A to H for electrode interconnection formed in the first and second oxygen electrode plates 21, 62 and in the hydrogen electrode plates 1, 60.

If the pins A to H for electrode interconnection, formed in the first and second oxygen electrode plates 21, 62 and in the hydrogen electrode plates 1, 60 are to be selectively severed or left intact, as shown in the following Table 1,

TABLE 1

| electrodes | A | B | C | D | E | F | G | H |
|---|---|---|---|---|---|---|---|---|
| 21 |   |   |   |   | 0 |   |   |   |
| 1  | 0 |   | 0 | 0 |   |   |   |   |
| 60 |   |   | 0 | 0 | 0 |   |   |   |
| 62 |   | 0 |   |   |   |   |   |   | the first and second unit cells 51, 52 are connected in series with each other.

In Table 1, [0] denotes that the relevant pin for electrode interconnection is left intact without cutting.

That is, in the first oxygen electrode plate 21 forming the first unit cell 51, the pin for electrode interconnection E only is left, with the pins for electrode interconnection A, B, C, D, F, G and H being severed, whereas, in the second oxygen electrode plate 60 forming the second unit cell 52, the pins C, D and E for electrode interconnection are left, with the pins for electrode interconnection A, B, F, G and H being severed. The pin for electrode interconnection E formed in the first oxygen electrode plate 21 forming the first unit cell 51 is bent downwards, whereas the pin for electrode interconnection E formed in the second hydrogen electrode plate 60 forming the second unit cell 52 is bent upwards and coupled to the pin for electrode interconnection E formed in the second hydrogen electrode plate 60.

As a result, the first and second unit cells 51, 52 are connected in series with each other.

On the other hand, in the first hydrogen electrode plate 1 forming the first unit cell 51, the pins for electrode interconnection A, C and D are left, with the pins for electrode interconnection B, E, F, G and H being severed, whereas, in the second oxygen electrode plate 62 forming the second unit cell 52, only the pin for electrode interconnection B is left, with the pins for electrode interconnection A, C, D, E, F, G and H being severed. The pin for electrode interconnection A, formed in the first hydrogen electrode plate 1, forming the first unit cell 51, and the pin for electrode interconnection B, formed in the second oxygen electrode plate 62, forming the second unit cell 52, are separately coupled to outputs.

If the pins for electrode interconnection A to H formed in the first oxygen electrode plate 21 or 62, first hydrogen electrode plate 1 and in the second hydrogen electrode plate 60 are selectively severed or left intact, as shown in Table 2,

TABLE 2

| electrodes | A | B | C | D | E | F | G | H |
|---|---|---|---|---|---|---|---|---|
| 21 |   |   |   |   |   | 0 |   |   |
| 1  | 0 |   | 0 | 0 | 0 |   |   |   |
| 60 |   |   | 0 | 0 | 0 |   |   |   |
| 62 |   | 0 |   |   |   | 0 |   |   | the first and second unit cells 51, 52 are connected in parallel with each other.

That is, in the first oxygen electrode plate 21, forming the first unit cell 51, the pin for electrode interconnection F is left, with the pins for electrode interconnection A, B, C, D, E, G and H being severed, whereas, in the second oxygen electrode plate 62 forming the second unit cell 52, the pins B and F for electrode interconnection are left, with the pins for electrode interconnection A, C, D, E, G and H being severed. The pin for electrode interconnection F formed in the first oxygen electrode plate 21 forming the first unit cell 51 is bent downwards, whereas the pin for electrode interconnection F formed in the second oxygen electrode plate 62 forming the second unit cell 52 is bent upwards and coupled to the pin for electrode interconnection F formed in the first oxygen electrode plate.

Also, in the first hydrogen electrode plate 1, forming the first unit cell 51, the pins for electrode interconnection A, C, D and E are left, with the pins for electrode interconnection B, F, G and H being severed, whereas, in the second hydrogen electrode plate 60 forming the second unit cell 52, the pins C, D and E for electrode interconnection are left, with the pins for electrode interconnection A, B, F, G and H being severed. The pin for electrode interconnection E formed in the first hydrogen electrode plate 1 forming the first unit cell 51 is bent downwards, whereas the pin for electrode interconnection E formed in the second hydrogen electrode plate 60 forming the second unit cell 52 is bent upwards and coupled to the pin for electrode interconnection E formed in the first hydrogen electrode plate.

The result is that the first and second unit cells 51, 52 are connected in parallel with each other.

The pin for electrode interconnection A formed in the first hydrogen electrode plate 1 forming the first unit cell 51 and the pin for electrode interconnection B formed in the second oxygen electrode plate 62 forming the second unit cell 52 are separately coupled to outputs.

In the first unit cell 51, forming the present embodiment of the electrical energy generating device, the hydrogen gas flow path plate 6 is stacked on the first hydrogen electrode plate 1 so that the points of intersection 15 of the lattice 4 forming the square-shaped apertures 2 and the triangular apertures 3 of the hydrogen electrode plate 1 are in coincidence with the center points of the square-shaped apertures 9 formed in the hydrogen gas flow path plate 6 and so that the points of intersection 16 of the lattice 10 forming the small-sized square-shaped apertures 12 and the rectangular apertures 13 of the hydrogen gas flow path plate 6 are in coincidence with the center points of the square-shaped aperture 2 formed in the hydrogen electrode plate 1. The result is that the square-shaped apertures 9 formed in the hydrogen gas flow path plate 6 communicate with the square-shaped apertures 2 and four of the triangular apertures 3, formed in the first hydrogen electrode plate 1, and each of the small-sized square-shaped apertures 12 communicates with one of the square-shaped apertures 2 formed in the hydrogen gas flow path plate 6, while the rectangular apertures 13 formed in the hydrogen gas flow path plate 6 communicate with one another and, excepting the two rectangular apertures 13 communicating with each other and with the first cut-out 7, communicate with both the square-shaped aperture 2 and two triangular apertures 3 formed in the first hydrogen electrode plate 1. The two rectangular apertures 13, formed in the hydrogen gas flow path plate 6 and which are in communication with each other and with the first cut-out 7, communicate with the one square-shaped aperture 2 and two of the triangular apertures 3.

Thus, with the first unit cell 51, forming the electrical energy generating device according to the present invention, the hydrogen gas, supplied from the hydrogen gas supply unit 17 to each of the square-shaped apertures 9 formed in the hydrogen gas flow path plate 6, flows into four of the triangular apertures 3 and the square-shaped aperture 2 formed in the first hydrogen electrode plate 1, while the hydrogen gas supplied to each of the small-sized square-shaped aperture 12 formed in the hydrogen gas flow path plate 6 flows into one of the square-shaped apertures 2 formed in the first hydrogen electrode plate 1. The hydrogen gas supplied to the rectangular apertures 13, formed in the hydrogen gas flow path plate 6, flows into the square-shaped aperture 2 and the triangular apertures 13, formed in the first hydrogen electrode plate 1, excepting the two rectangular apertures 13 communicating with each other and with the first cut-out 7, while the hydrogen gas, supplied to the two rectangular apertures 13 formed in the hydrogen gas flow path plate 6 and communicating with each other and with the first cut-out 7, flows into the sole square-shaped aperture 2 and into the two triangular apertures 3 formed in the first hydrogen electrode plate 1.

Moreover, in the first unit cell 51 according to the present invention, in which the first hydrogen electrode plate and the hydrogen gas flow path plate 6 are stacked one on another as described above, the square-shaped apertures 2 formed in the first hydrogen electrode plate 1, except the square-shaped aperture 2 disposed at an upper end in FIG. 1, communicate with the square-shaped aperture 9 formed in the hydrogen gas flow path plate 6, with the small-sized square-shaped aperture 12 and with four of the rectangular apertures 13. The square-shaped aperture 2 disposed at the upper end in FIG. 1 communicates with two mutually neighboring square-shaped aperture 9 and with two rectangular apertures 13 communicating with each other and with the first cut-out 7, formed in the hydrogen gas flow path plate 6, while the triangular apertures 3 formed in the first hydrogen electrode plate 1 communicate with the square-shaped apertures 9 and with the rectangular apertures 13, formed in the hydrogen gas flow path plate 6, as shown in FIG. 3.

The result is that, in the first unit cell 51 of the present invention, the hydrogen gas, flowing into the square-shaped apertures 2 formed in the first hydrogen electrode plate 1, excluding the square-shaped aperture 2 disposed at the upper end, flows into the mutually neighboring square-shaped apertures 9, formed in the hydrogen gas flow path plate 6, small-sized square-shaped apertures 12 and into four of the rectangular apertures 13 in the hydrogen gas flow path plate 6 mutually neighboring to each other. The hydrogen gas, flowing into the square-shaped apertures 2 formed in the upper end in FIG. 1, flows into two mutually neighboring square-shaped apertures 9 and into the two rectangular apertures 13 in the hydrogen gas flow path plate 6 communicating with each other and with the first cut-out 7. On the other hand, the hydrogen gas, flowing into the triangular apertures 3 formed in the hydrogen gas flow path plate 6, flows into the square-shaped apertures 9 and two rectangular apertures 13 formed in the hydrogen gas flow path plate 6.

Thus, with the first unit cell 51, constructed as described above, the hydrogen gas, supplied from the hydrogen gas supplying unit 17 into the inside of the electrical energy generating device, flows through a space between the first hydrogen electrode plate 1 and the hydrogen gas flow path plate 6, as it is spread two-dimensionally, and as it repeatedly contacts the hydrogen electrode plate 1, until it is ejected through the hydrogen gas ejection unit 19 to outside the first unit cell, as described above. Thus, the hydrogen gas is able to contact the first hydrogen electrode plate 1 efficiently thus improving the efficiency in generating the electrical energy of the electrical energy generating device.

With the above-described first unit cell 51, it is only sufficient if the hydrogen gas flow path plate 6, carrying the first cut-out 7 forming the hydrogen gas supplying unit, the second cut-out 8 forming the hydrogen gas ejection unit, 12 square-shaped apertures 9 of the same size as the square-shaped apertures 2 formed in the hydrogen electrode plate 1, four small-sized square-shaped apertures 12 and eight rectangular apertures 13, and the first hydrogen electrode plate 1, carrying 13 square-shaped apertures 2 and eight triangular apertures 3, formed by lattices in a regular array, are stacked together so that the points of intersection 15 of the lattice 4 forming the square-shaped apertures 2 and the triangular apertures 3 of the hydrogen electrode plate 1 are in coincidence with the center points of the square-shaped apertures 9 formed in the hydrogen gas flow path plate 6 and so that the points of intersection 16 of the lattice 10 forming the small-sized square-shaped apertures 12 and the rectangular apertures 13 of the hydrogen gas flow path plate 6 are in coincidence with the center points of the square-shaped aperture 2 formed in the hydrogen electrode plate 1. Thus, assembling operations may be facilitated, while the hydrogen gas may be routed by a simplified structure into contact with the first hydrogen electrode plate 1 to provide an electrical energy generating device capable of improving the efficiency in generating the electrical energy.

Moreover, in the first unit cell 51 according to the present invention, the first module retention plate 40 is tightly contacted to the first air flow path plate 26 so that the center point of each circular aperture 41 formed in the first module retention plate 40 coincides with a point of intersection 36 of the lattice 30 forming the square-shaped apertures 29 of the first air flow path plate 26, as a result of which the nine apertures 41 at a mid portion of the module retention plate 40, among the square-shaped apertures 41 formed in the module retention plate 40, communicate with the four mutually neighboring square-shaped apertures 29, formed in the first air flow path plate 26, the circular aperture 41 disposed at an upper mid portion in FIGS. 8 and 10 communicates with the two mutually neighboring square-shaped apertures 29 and with the cut-outs 27a and 28a formed in the first air flow path plate 26, the circular aperture 41 at the mid right end communicates with the two mutually neighboring square-shaped apertures 29 and cut-outs 27b, 28b, formed in the first air flow path plate 26, the circular aperture 41, formed at a lower mid end, communicates with the two mutually neighboring square-shaped apertures 29 and cut-outs 27c, 28c formed in the first air flow path plate 26, and the circular aperture 41 at the mid left end communicates with two mutually neighboring square-shaped apertures 29 and cut-outs 27d, 28d formed in the first air flow path plate 26, as shown in FIG. 10. Moreover, the other circular apertures 41, formed in the first module retention plate 40, communicate with two mutually neighboring square-shaped apertures 29 and cut-outs 27a, 28a, 27b, 28b, 27c, 28c, 27d or 28d, formed in the first air flow path plate 26, as similarly shown in FIG. 10.

Thus, with the present first unit cell 51, the air supplied to the nine apertures 41 at a mid portion of the first module retention plate 40 flows into the four mutually neighboring square-shaped apertures 29 formed in the first air flow path plate 26, the air supplied to the circular aperture 41 at the upper mid end in FIGS. 8 and 10 flows into two mutually neighboring square-shaped apertures 29 and cut-outs 27a, 28a formed in the first air flow path plate 26, the air supplied to the circular aperture 41 at a right mid portion flows into the two mutually neighboring square-shaped apertures 29 and cut-outs 27b, 28b formed in the first air flow path plate 26, the air supplied to the circular aperture 41 at the lower mid end in FIGS. 8 and 10 flows into two reciprocally neighboring square-shaped apertures 29 and cut-outs 27c, 28c formed in the first air flow path plate 26, and the air supplied to the circular aperture 41 at a left mid portion flows into the two mutually neighboring square-shaped apertures 29 and cut-outs 27d, 28d formed in the first air flow path plate 26. The air supplied to the other circular apertures 41 formed in the first module retention plate 40 flow into the two mutually neighboring square-shaped apertures 29 and into the cut-outs 27a, 28a, 27b, 28b, 27c, 28c, 27d or 28d, formed in the first air flow path plate 26.

In the first unit cell 51, according to the present invention, the first oxygen electrode plate 21 and the first air flow path plate 26 are stacked one on another so that points of intersection 35 of a lattice 24 forming the square-shaped apertures 22 and the triangular apertures 23 of the first oxygen electrode plate 21 are in coincidence with the center points of the square-shaped apertures 29 formed in the hydrogen gas flow path plate 26, and so that the points of intersection 36 of ths lattice 30 forming the square-shaped apertures 29 formed in the hydrogen gas flow path plate 26 are in coincidence with the center points of the square-shaped apertures 22 in the first oxygen electrode plate 21. The result is that the square-shaped apertures 22 formed in the first oxygen electrode plate 21, except the apertures 29 at upper and lower left and right ends in FIG. 5, communicate with the four reciprocally neighboring square-shaped apertures 29, formed in the first air flow path plate 26, and the apertures 29 at the upper end communicate with the two mutually neighboring square-shaped apertures 29 and cut-outs 27a, 28a, formed in the first air flow path plate 26, while the apertures 29 at the right end communicate with the two mutually neighboring square-shaped apertures 29 and cut-outs 27b, 28b, formed in the first air flow path plate 26, and the apertures 29 at the lower end communicate with the two mutually neighboring square-shaped apertures 29 and cut-outs 27c, 28c, formed in the first air flow path plate 26. Moreover, the apertures 29 at the left end communicate with the two mutually neighboring square-shaped apertures 29 and cut-outs 27d, 28d, formed in the first air flow path plate 26, while triangular apertures 23, formed in the first oxygen electrode plate 21, communicate with two mutually neighboring square-shaped apertures 29 and the cut-outs 27a, 28a, 27b, 28b, 27c, 28c, 27d or 28d, formed in the first air flow path plate 26. Of the square-shaped apertures 29, formed in the first air flow path plate 26, the four centrally disposed square-shaped apertures 29 communicate with the four reciprocally neighboring square-shaped apertures 22 formed in the first oxygen electrode plate 21. The four square-shaped apertures 29, disposed at the four corners in FIG. 6, each communicate with one square-shaped aperture 22 and with two triangular apertures 23 formed in the first oxygen electrode plate 21. The remaining square-shaped apertures 29 formed in the first air flow path plate 26 each communicate with three reciprocally neighboring square-shaped aperture 22 and two triangular apertures 23 formed in the first oxygen electrode plate 21. On the other hand, the cut-outs 27a, 28a, 27b, 28b, 27c, 28c, 27d or 28d, formed in the first air flow path plate 26, each communicate with one square-shaped aperture 22 and one triangular aperture 23 formed in the first oxygen electrode plate 21.

The result is that the air supplied to the nine centrally arranged apertures 41 formed in the first module retention plate 40 flows into the four reciprocally neighboring square-shaped apertures 29 formed in the first air flow path plate 26, whereas the air supplied to the circular aperture 41 arranged at an upper mid portion in FIGS. 8 and 10 flows into the two mutually neighboring square-shaped apertures 29 and the cut-outs 27a, 28a formed in the first air flow path plate 26, while the air supplied to the circular aperture 41 arranged at the right mid portion flows into the two mutually neighboring square-shaped apertures 29 and the cut-outs 27b, 28b formed in the first air flow path plate 26. Also, the air supplied to the circular aperture 41 arranged at the lower mid portion in FIGS. 8 and 10 flows into the two mutually neighboring square-shaped apertures 29 and the cut-outs 27c, 28c formed in the first air flow path plate 26, while the air supplied to the circular aperture 41 arranged at the left mid portion flows into the two mutually neighboring square-shaped apertures 29 and the cut-outs 27d, 28d formed in the first air flow path plate 26. The air supplied into the other circular apertures 41 formed in the first module retention plate 40 flow into the two mutually neighboring square-shaped apertures 22 and the 27a, 28a, 27b, 28b, 27c, 28c, 27d or 28d, formed in the first air flow path plate 26. Of the air flowing into the square-shaped apertures 29 formed in the first air flow path plate 26, the air flowing into the four apertures 29 in the mid portion flows into four reciprocally neighboring apertures 22 formed in the first oxygen electrode plate 21, while the air flowing into the four mutually neighboring square-shaped aperture 29 at the four corners in FIG. 6 flows into one square-shaped aperture 22 and into two triangular apertures 23 formed in the first oxygen electrode plate 21. On the other hand, the air flowing into the remaining square-shaped apertures 29 formed in the first air flow path plate 26 flows into reciprocally neighboring three square-shaped apertures 22 and into two triangular apertures 23 formed in the first oxygen electrode plate 21. The air flowing into the cut-outs 27a, 28a, 27b, 28b, 27c, 28c, 27d, 28d formed in the first air flow path plate 26 flows into one square-shaped aperture 22 and one triangular aperture 23 formed in the first oxygen electrode plate 21.

Thus, with the first unit cell 51 according to the present invention, the air is supplied through the apertures 41 formed in the first module retention plate 40 to the apertures 29 and the cut-outs 27a, 28a, 27b, 28b, 27c, 28c, 27d, 28d formed in the first air flow path plate 26, and then to the square-shaped apertures 22 and the triangular apertures 23 formed in the first oxygen electrode plate 21. The result is that assembling operations may be facilitated, while oxygen may be contacted efficiently with the first oxygen electrode plate 21 to produce an electrical energy generating device capable of improving the efficiency in generating the electrical energy.

With the first unit cell 51, according to the present invention, it is only sufficient to stack the first air flow path plate 26, including a lattice 24 of 13 square-shaped apertures 22 and eight triangular apertures 23 in a regular array, the first air flow path plate 26 carrying 16 square-shaped apertures 29 of the same size as the apertures 22 formed in the first air flow path plate 26 and the cut-outs 27a, 28a, 27b, 28b, 27c, 28c, 27d, 28d, and the first module retention plate 40 comprised of a regular array of 21 circular apertures 41, in this order. The result is that assembling operations may be facilitated, while air may be furnished by a simplified structure into contact with the first air flow path plate 26 to produce an electrical energy generating device capable of improving the efficiency in generating the electrical energy.

Moreover, in the first unit cell 51 of the present invention, the first hydrogen electrode plate 1 and the hydrogen gas flow path plate 6 are stacked and contacted together so that the points of intersection 15 of the lattice 4 forming the square-shaped apertures 2 and the triangular apertures 3 of the first hydrogen electrode plate 1 are in coincidence with the center points of the square-shaped apertures 9 formed in the hydrogen gas flow path plate 6 and so that the points of intersection 16 of the lattice 10 forming the small-sized square-shaped apertures 12 and the rectangular apertures 13 of the hydrogen gas flow path plate 6 are in coincidence with the center points of the square-shaped aperture 2 formed in the first hydrogen electrode plate 1, as shown in FIG. 3.

Moreover, in the first unit cell 51, the first air flow path plate 26 is tightly stacked on the first oxygen electrode plate 21 so that the points of intersection 35 of the lattice 24 forming the square-shaped apertures 22 and the triangular apertures 23 of the first oxygen electrode plate 21 are coincident with the center points of the square-shaped apertures 22 formed in the first oxygen electrode plate 21 and so that the points of intersection 36 of the lattice 30 forming the square-shaped apertures 29 of the first oxygen electrode plate 21 are coincident with the center points of the square-shaped apertures 22 formed in the first oxygen electrode plate 21, as shown in FIG. 7. In addition, the first module retention plate 40 is tightly contacted to the first air flow path plate 26 so that the center points of the respective circular apertures 41 formed in the first module retention plate 40 are in coincidence with the points of intersection 36 of the lattice 30 forming the square-shaped apertures 29 of the first hydrogen gas flow path plate 26 and so that the points of intersection 43 of the lattice 42 forming the circular apertures 41 of the first module retention plate 40 are in coincidence with the center points of the square-shaped apertures 29 formed in the first air flow path plate 26, as shown in FIG. 10.

Thus, with the first unit cell 51 according to the present invention, the force applied to the first module retention plate 40 in a distributed fashion to the first air flow path plate 26 and thence transmitted in a distributed fashion to the first oxygen electrode plate 21. The force transmitted to the first oxygen electrode plate 21 is transmitted through the seal 46 to the first hydrogen electrode plate 1, but is transmitted, again in a distributed fashion, to the hydrogen gas flow path plate 6. Since the force applied to the first module retention plate 40 is transmitted is distributed to enable the uniform force to be applied reliably to the electrical energy generating device in its entirety, the first proton conductor film 45 evenly contacts the first hydrogen electrode plate 1 and the first oxygen electrode plate 21 to improve the efficiency in generating the electrical energy.

With the above-described electrical energy generating device according to the present invention, the hydrogen gas flow path is formed by the first hydrogen electrode plate 1, hydrogen gas flow path plate 6 and by the second hydrogen electrode plate 60, such that the hydrogen gas is supplied from the hydrogen gas supply unit 17 into the hydrogen gas flow channel formed by the first hydrogen electrode plate 1, hydrogen gas flow path plate 6 and by the second hydrogen electrode plate 60 to flow through the hydrogen gas flow channel as it is spread two-dimensionally, and as it repeatedly contacts the first and second hydrogen electrode plates 1, 60, as described above, until it is ejected through the hydrogen gas ejection unit 19 to outside the first unit cell.

The air supplied through the second module retention plate 64 is supplied to the second module retention plate 62, through the first module retention plate 40, as it is spread two-dimensionally through the second oxygen electrode plate 63.

Figure 13:
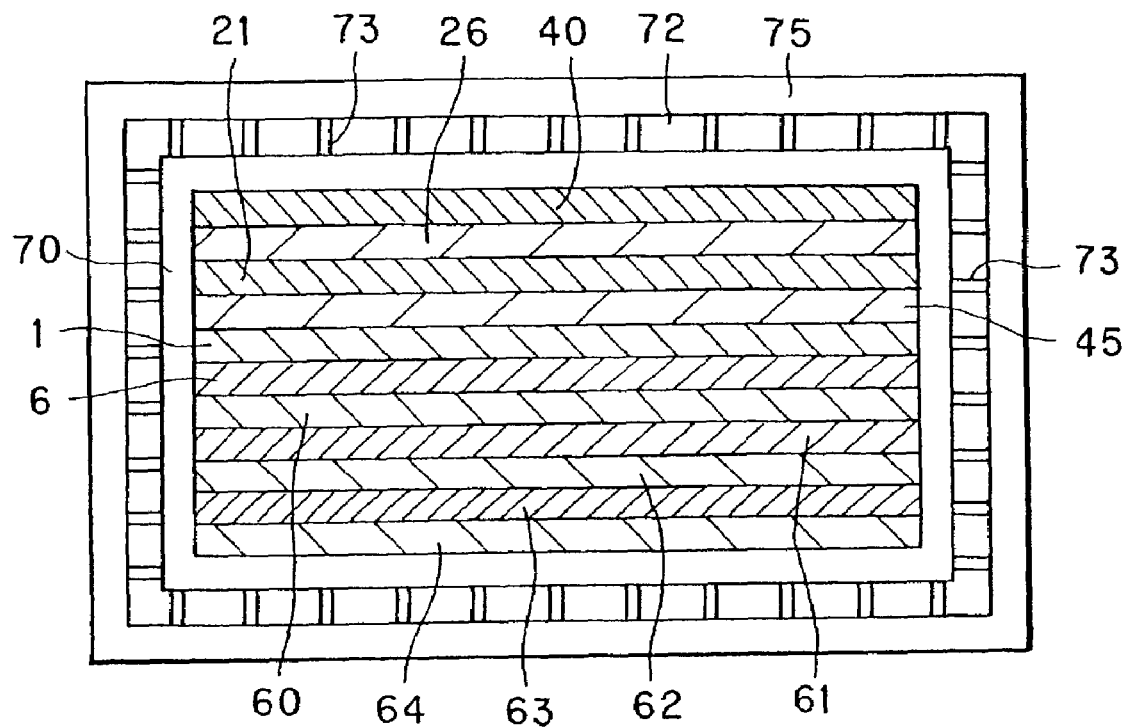
FIG. 13 is a schematic longitudinal cross-sectional view of the electrical energy generating device according to the present invention.

FIG. 13 shows a further embodiment of the electrical energy generating device according to the present invention.

In the electrical energy generating device, shown in FIG. 13, the seal members 46, 65 are omitted from the drawing.

Figure 14:
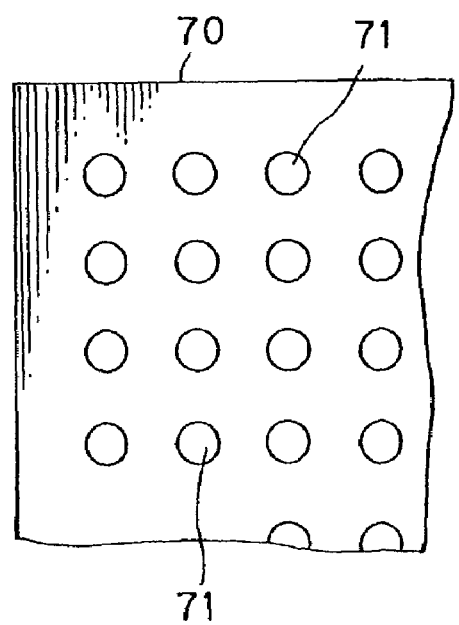
FIG. 14 is a schematic plan view of a water absorbing sheet.

Referring to FIG. 13, the electrical energy generating device is a layered assembly including of a first unit cell 51 and a second unit cell 52. The surface of the layered assembly, formed of the first unit cell 51 and the second unit cell 52, is covered with a water-absorbent sheet 70. FIG. 14 shows an embodiment of this water-absorbent sheet 70. Referring to FIG. 14, the water-absorbent sheet 70 has numerous apertures 71 through which air may be supplied to the first oxygen electrode plate 21 and to the second oxygen electrode plate 62. The water-absorbent sheet 70 is formed of a water-absorbent resin, such as a cross-linked neutralized product of polyacrylic acid. With the water-absorbent sheet, oxygen, protons and electrons are linked together to absorb water generated in the first oxygen electrode plate 21 and the second oxygen electrode plate 62, for removing the water from the surface of the first oxygen electrode plate 21 and the second oxygen electrode plate 62.

The water-absorbent sheet 70 is sheathed by a casing 72, as shown in FIG. 13. This casing 72 has numerous apertures 71 through which the air may be supplied to the first oxygen electrode plate 21 and to the second oxygen electrode plate 62.

The casing 72 is shrouded by a sheet cover 75, having both air permeability and waterproofing properties, as shown in FIG. 13. Thus, the sheet cover 75 affords waterproof characteristics to the electrical energy generating device. Moreover, since the sheet cover 75 is water-permeable, air can be supplied through the sheet cover 75 to the first oxygen electrode plate 21 and the second oxygen electrode plate 62. Moreover, water yielded on the first oxygen electrode plate 21 and the second oxygen electrode plate 62 through linkage reaction of oxygen, protons and electrons may be vaporized off through the sheet cover 75.

In the embodiment shown in FIG. 13, the sheet cover 75 is air-permeable and waterproofed so that oxygen in atmospheric air may be supplied efficiently to the first oxygen electrode plate 21 and the second oxygen electrode plate 62 for reaction with protons and electrons. Through the reaction of oxygen, protons and electrons, the water yielded on the first oxygen electrode plate 21 and the second oxygen electrode plate 62 may be vaporized and removed efficiently, while the electrical energy generating device may be improved in waterproof characteristics.

Since the water-absorbent sheet 70, which is air-permeable and exhibits waterproofing properties, is provided on the inner side of the sheet cover 75, for sheathing the first and second unit cells 51, 52, water yielded on the first oxygen electrode plate 21 and the second oxygen electrode plate 62 by reaction of oxygen, protons and electrons may be efficiently removed from the first oxygen electrode plate 21 and the second oxygen electrode plate 62 to improve the efficiency of generation of the electrical energy.

Moreover, since the water-absorbent sheet 70 has numerous apertures 71, oxygen in atmospheric air may be efficiently supplied to the first oxygen electrode plate 21 and the second oxygen electrode plate 62 for reaction with protons and electrons. Through the reaction of oxygen, protons and electrons, the water yielded on the first oxygen electrode plate 21 and the second oxygen electrode plate 62 may be efficiently vaporized and removed.

The present invention can be modified within the scope of the present invention without being limited to the above-described embodiments.

For example, the numerous apertures 71 are formed in the water-absorbent sheet 70, so that oxygen in atmospheric air is supplied to the first oxygen electrode plate 21 and the second oxygen electrode plate 62, while oxygen, protons and electrons are reacted through these numerous apertures 71 to vaporize off the water yielded on the first oxygen electrode plate 21 and the second oxygen electrode plate 62. It is, however, only sufficient if the water-absorbent sheet 70 exhibits water absorption characteristics and air permeability, without it being imperative to form the numerous apertures 71.

In the above-described embodiment, the first hydrogen electrode plate 1 and the hydrogen gas path forming plate 6 are superposed on and tightly contacted to each other so that the points of intersection 15 of the lattice 4 forming the square-shaped apertures 2 and the triangular apertures 3 of the first hydrogen electrode plate 1 are coincident with the center point of the square-shaped apertures 9 formed in the first air flow path plate 6 and so that the points of intersections 16 of the lattice 10 forming the square-shaped apertures 9, small-sized square-shaped apertures 12 and the rectangular apertures 13 of the hydrogen gas path forming plate 6 are coincident with the center points of the square-shaped apertures 2 formed in the first hydrogen electrode plate 1. However, it is not mandatory to have the first hydrogen electrode plate 1 and the hydrogen gas path forming plate 6 tightly contacted together in this manner since it is only sufficient if the first hydrogen electrode plate 1 and the hydrogen gas path forming plate 6 are tightly contacted together so that each of the multiple apertures formed in the first hydrogen electrode plate 1 communicates with two or more of the multiple apertures formed in the hydrogen gas flow path plate 6, with each of the multiple apertures formed in the hydrogen gas flow path plate 6 communicating with two or more of the multiple apertures formed in the first hydrogen electrode plate 1.

Although the 13 square-shaped apertures 2 and 8 triangular apertures 3 are formed in the first hydrogen electrode plate 1, the numbers of the square-shaped apertures 2 and the triangular apertures 3 may be set arbitrarily. Moreover, the shape of the apertures is not limited to a square or triangular shape, but also may be polygonal, such as a rectangular shape, or circular.

In addition, although the 12 square-shaped apertures 9 of the same size as the square-shaped apertures 2 formed in the first hydrogen electrode plate 1, four small-sized square-shaped apertures and eight triangular apertures 13 are formed in the hydrogen gas flow path plate 6, it is not mandatory to have the square-shaped apertures 9 of the same size as the square-shaped apertures 2 formed in the first hydrogen electrode plate 1, such that the numbers of the square-shaped apertures 9, small-sized square-shaped apertures 12 and the triangular apertures 13 may be optionally set, while the shape of the apertures is not limited to the square or rectangular shape, but may be polygonal, such as rectangular shape, or to a circular shape.

It is noted that, in the above-described embodiment, the first oxygen electrode plate 21 and the first air flow path plate 26 are superposed on and tightly contacted to each other to form the first unit cell 51 so that the points of intersection 35 of the lattice 24 forming the square-shaped apertures 22 and the triangular apertures 23 of the first oxygen electrode plate 21 are coincident with the center points of the square-shaped apertures 29 formed in the first air flow path plate 26 and so that the points of intersections 36 of the lattice 30 forming the square-shaped apertures 29 formed in the first air flow path plate 26 are coincident with the center points of the square-shaped apertures 22 formed in the first oxygen electrode plate 21. However, it is not mandatory for the first oxygen electrode plate 21 and the first air flow path plate 26 to be tightly contacted together in this manner since it is only sufficient if the first oxygen electrode plate 21 and the first air flow path plate 26 are tightly contacted together so that each of the multiple square-shaped apertures 22 and the triangular apertures 23 formed in the first oxygen electrode plate 21 communicates with two or more of the multiple square-shaped apertures 29 formed in the first air flow path plate 26, with each of the multiple square-shaped apertures 29 formed in the first air flow path plate 26 communicating with two or more of the triangular apertures 23 and the multiple square-shaped apertures 22 formed in the first oxygen electrode plate 21.

Although the first oxygen electrode plate 21 is shaped in the same way as the first hydrogen electrode plate 1, and 13 square-shaped apertures 22 and 8 triangular apertures 23 are formed in the first oxygen electrode plate 21, the numbers of the square-shaped apertures 22 and the triangular apertures 23 may be set arbitrarily. Moreover, the shape of the apertures is not limited to a square or triangular shape, but may also be polygonal, such as a rectangular shape, or circular. Moreover, it is not mandatory that the first oxygen electrode plate 21 be shaped similarly to the first hydrogen electrode plate 1.

Although the 16 square-shaped apertures 29 of the same size as the square-shaped apertures 22 formed in the first oxygen electrode plate 21 and the cut-outs 27a, 28a, 27b, 28b, 27c, 28c, 27d, 28d are formed in the first air flow path plate 26, it is not mandatory to provide the square-shaped apertures 29 of the same size as the square-shaped apertures 22 formed in the first oxygen electrode plate 21. Moreover, the number of the square-shaped apertures 29 and the number of the cut-outs 27a, 28a, 27b, 28b, 27c, 28c, 27d, 28d formed in the first air flow path plate 26 may be set arbitrarily. The shape of the apertures formed in the first air flow path plate 26 is not limited to the square shape, but they also may be polygonal, such as rectangular or triangular, or circular; while it is not mandatory to provide the cut-outs 27a, 28a, 27b, 28b, 27c, 28c, 27d, 28d shown in FIG. 6.

Although the first module retention plate 40 is tightly contacted to the first air flow path plate 26 so that the center point of the circular apertures 41 formed in the first module retention plate 40 are coincident with the points of intersection 36 of the lattice 30 forming the square-shaped apertures 29 of the first air flow path plate 26 and so that the points of intersection 43 of the lattice 42 forming the circular apertures 41 of the first module retention plate 40 are coincident with the center point of the square-shaped apertures 29 of the first air flow path plate 26. However, it is not mandatory for the first module retention plate 40 and the first air flow path plate 26 to be tightly contacted together in this manner since it is only sufficient if the first module retention plate 40 and the first air flow path plate 26 are tightly contacted together so that each of the multiple circular apertures 41 formed in the first module retention plate 40 communicates with two or more of the multiple square-shaped apertures 29 formed in the first air flow path plate 26, with each of the multiple square-shaped apertures 29 formed in the first air flow path plate 26 communicating with two or more of the multiple circular apertures 41 formed in the first module retention plate 40.

Although 21 circular apertures 41 are formed in the first module retention plate 40, in the above-described embodiment, the number of the circular apertures 41 formed in the first module retention plate 40 may be set arbitrarily. The apertures formed in the first module retention plate 40 are not limited to circular shape, but square-shaped, rectangular or triangular apertures may be formed in the first module retention plate 40.

Although the first hydrogen electrode plate 1 is formed of stainless steel, it is not mandatory to form the first hydrogen electrode plate 1 of stainless steel, such that it may be formed of hastelloy, nickel, molybdenum, copper, aluminum, iron, silver, gold, platinum, tantalum or titanium, or alloys of two or more of these materials.

Although the hydrogen gas flow path plate 6 is formed of polycarbonate, it is not mandatory to form the hydrogen gas flow path plate 6 of polycarbonate, such that the hydrogen gas flow path plate 6 may be formed of acrylic resin, ceramics, carbon, hastelloy, stainless steel, nickel, molybdenum, copper, aluminum, iron, silver, gold, platinum, tantalum or titanium, or alloys of two or more of these materials.

Although the first oxygen electrode plate 21 is formed of stainless steel, it is not mandatory to form the first oxygen electrode plate 21 of stainless steel, such that the first oxygen electrode plate 21 may be formed of hastelloy, nickel, molybdenum, copper, aluminum, iron, silver, gold, platinum, tantalum or titanium, or alloys of two or more of these materials.

Although the first air flow path plate 26 is formed of polycarbonate, it is not mandatory that the first air flow path plate 26 be formed of polycarbonate, such that it also may be formed of acrylic acid, ceramics, carbon, hastelloy, stainless steel, nickel, molybdenum, copper, aluminum, iron, silver, gold, platinum, tantalum or titanium, in place of polycarbonate.

Although the eight rectangular pins for electrode interconnection A to H are formed on the four sides of each of the first hydrogen electrode plate 1, second hydrogen electrode plate 60, first oxygen electrode plate 21 and the second oxygen electrode plate 62, the number, shape and the forming positions of the pins for electrode interconnection A to H may be selected and determined in optional manner. It is not mandatory that the eight pins for electrode interconnection A to H be formed on the four sides of each of the first hydrogen electrode plate 1, second hydrogen electrode plate 60, first oxygen electrode plate 21 and the second oxygen electrode plate 62.

Indeed, although the present invention has been described with reference to specific embodiments, those of skill in the art will recognize that changes may be made thereto without departing from the spirit and scope of the present invention as set forth in the hereafter appended claims.

The invention claimed is:

1. An electrical energy generating device, comprising:
 a cell having at least a hydrogen electrode;
 a proton conductor film;
 an oxygen electrode;
 a sheet cover having both air permeability and waterproof characteristics, wherein the sheet cover shrouds the cell; and a water-absorbent sheet having air permeability characteristics and a water-absorbing property which is provided inside the sheet cover, wherein the water absorbent sheet shrouds the cell.

2. An electrical energy generating device as claimed in claim 1, further comprising a casing having a plurality of apertures between the sheet cover and the water-absorbent sheet, wherein the casing shrouds the cell.

3. An electrical energy generating device as claimed in claim 2, wherein the water-absorbent sheet is formed of a water-absorbent material having a plurality of apertures.

* * * * *